US010710082B2

(12) United States Patent
Gross et al.

(10) Patent No.: US 10,710,082 B2
(45) Date of Patent: Jul. 14, 2020

(54) SAMPLE PREPARATION DEVICES AND METHODS

(71) Applicant: Pressure BioSciences, Inc., South Easton, MA (US)

(72) Inventors: Vera Gross, Newtonville, MA (US); Edmund Y. Ting, Kent, WA (US); Alexander Lazarev, Lexington, MA (US); Richard T. Schumacher, South Easton, MA (US)

(73) Assignee: PRESSURE BIOSCIENCES, INC., South Easton, MA (US)

( * ) Notice: Subject to any disclaimer, the term of this patent is extended or adjusted under 35 U.S.C. 154(b) by 174 days.

(21) Appl. No.: 15/314,763

(22) PCT Filed: May 29, 2015

(86) PCT No.: PCT/US2015/033338
§ 371 (c)(1),
(2) Date: Nov. 29, 2016

(87) PCT Pub. No.: WO2015/184360
PCT Pub. Date: Dec. 3, 2015

(65) Prior Publication Data
US 2017/0106366 A1   Apr. 20, 2017

Related U.S. Application Data

(60) Provisional application No. 62/005,662, filed on May 30, 2014.

(51) Int. Cl.
*G01N 1/00* (2006.01)
*B01L 3/00* (2006.01)
*G01N 1/28* (2006.01)

(52) U.S. Cl.
CPC ......... *B01L 3/50853* (2013.01); *B01L 3/5082* (2013.01); *G01N 1/286* (2013.01); *B01L 2300/042* (2013.01); *B01L 2300/046* (2013.01)

(58) Field of Classification Search
CPC ...................................................... G01N 1/00
See application file for complete search history.

(56) References Cited

U.S. PATENT DOCUMENTS 4,074,971 A * 2/1978 Braun ................ G01N 33/4905
356/39
4,828,395 A 5/1989 Saito et al.
(Continued)

FOREIGN PATENT DOCUMENTS

JP    S63112974 A    5/1988
JP    2007218903 A   8/2007
(Continued)

*Primary Examiner* — Jyoti Nagpaul
(74) *Attorney, Agent, or Firm* — Lando & Anastasi, LLP

(57) ABSTRACT

Devices and methods for sample preparation via pressure cycling technology are disclosed. The device for sample preparation comprises a tube having an inner surface, a top, and a bottom, the tube configured to contain a sample at the bottom and to be received into a pressure chamber for sample preparation, a cap detachably connected to the top of the tube, and a tapered elongate member extending from the cap into the tube, the tapered elongate member configured to contact the inner surface of the tube and the sample in the bottom of the tube, wherein the tube is deformable such that in operation under pressure the tube is deformed against the tapered elongate member to promote disruption of the sample.

7 Claims, 25 Drawing Sheets

(56) References Cited

U.S. PATENT DOCUMENTS

| | | | |
|---|---|---|---|
| 5,335,773 A * | 8/1994 | Haber | A61J 1/2093 |
| | | | 206/219 |
| 5,586,732 A | 12/1996 | Yamauchi et al. | |
| 2004/0161788 A1 * | 8/2004 | Chen | B01L 3/502 |
| | | | 435/6.11 |
| 2005/0023182 A1 | 2/2005 | Shah | |
| 2005/0132775 A1 | 6/2005 | Laugham et al. | |
| 2009/0084202 A1 | 4/2009 | Mimori et al. | |
| 2010/0281955 A1 | 11/2010 | Ting et al. | |
| 2011/0146418 A1 | 6/2011 | Brevnov et al. | |
| 2014/0112845 A1 | 4/2014 | Edens et al. | |

FOREIGN PATENT DOCUMENTS

| | | |
|---|---|---|
| JP | 2013506846 A | 2/2013 |
| WO | 2012058412 A1 | 5/2012 |

* cited by examiner

| | Protein Yield from Heart Muscle (ug protein/mg tissue) | SEM | N= |
|---|---|---|---|
| 0kpsi | 34.43 | 2.56 | 20 |
| 5kpsi | 46.10 | 2.63 | 10 |
| 10kpsi | 54.24 | 5.51 | 10 |
| 20kpsi | 49.17 | 4.63 | 10 |
| 35kpsi | 49.87 | 2.73 | 20 |
| 45kpsi | 68.38 | 3.82 | 20 |

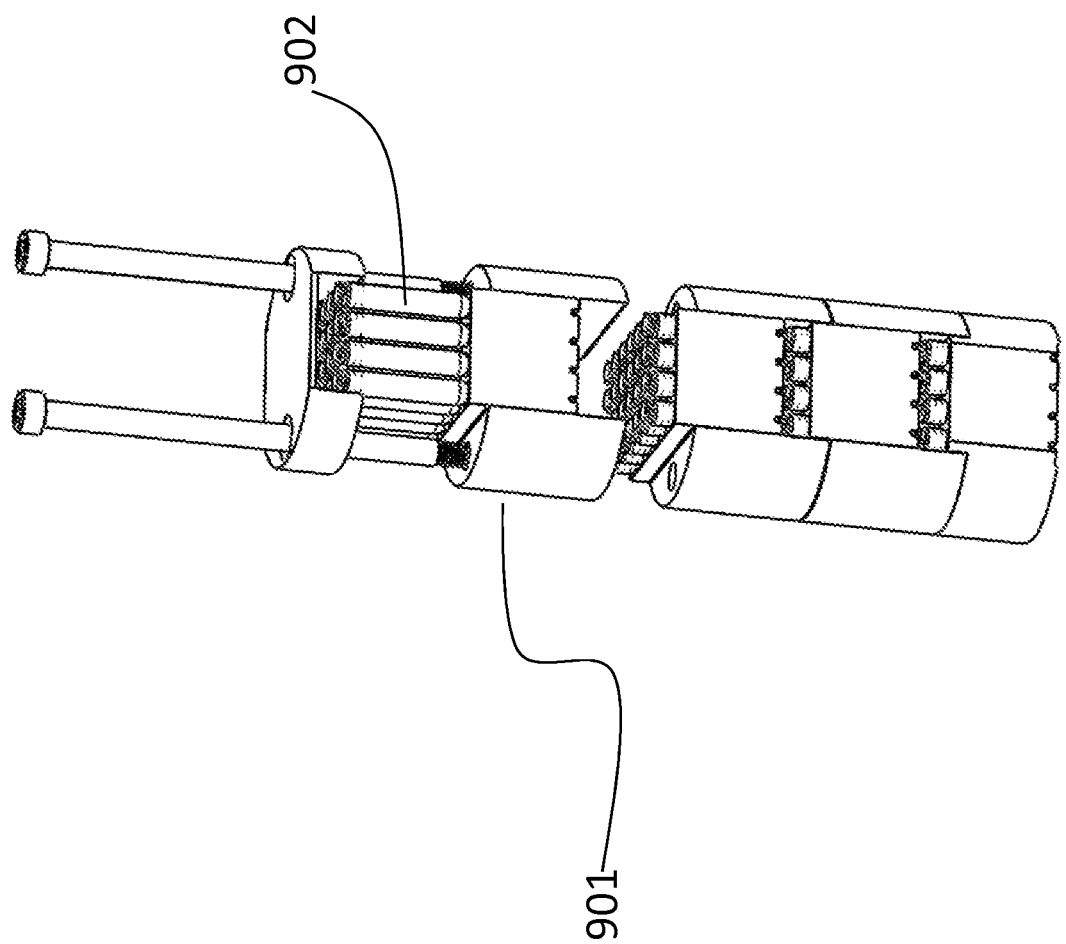

SAMPLE PREPARATION DEVICES AND METHODS

CROSS-REFERENCE TO RELATED APPLICATIONS

This application is a U.S. national phase application, and claims the benefit of priority under 35 U.S.C. § 371, of PCT/US2015/033338, titled SAMPLE PREPARATION DEVICES AND METHODS and filed on May 29, 2015, which in turn claims the benefit of priority to U.S. Provisional Patent Application Ser. No. 62/005,662 filed on May 30, 2014 which is hereby incorporated herein by reference in its entirety for all purposes.

FIELD OF THE TECHNOLOGY

One or more aspects relate to sample preparation and, more specifically, to integrated devices and methods for mechanical disruption of samples in closed containers.

BACKGROUND

Analysis of biological or environmental specimens typically requires sample-derived molecules to be present in solution. However, many types of samples (animal and plant tissues, soil samples, etc.) have a relatively tough structure whereby molecules of interest are contained within cells and the extracellular matrix and thus are not available for dissolution. Examples of samples that are difficult to extract are plant seeds, whole insects, and fibrous tissues. Preparation of such samples for analysis typically involves mechanical disruption of a specimen structure by a grinding, homogenization, or maceration operation in a suitable reagent.

While most analytical methods of separation and detection of specimen molecules are highly automated, initial sample preparation steps frequently require operator involvement and manual manipulations. Generally, large specimens and suspensions of single-cell organisms, such as mammalian or plant cell cultures, bacteria, or fungi, are processed in large-scale batch-mode or continuous high flow homogenizers, or systems that use high energy ultrasound, also known as ultrasonic cavitation. Small tissue samples of small amounts of cell suspensions cannot be efficiently processed in such equipment. As the sensitivity of analytical methods increases and discovery research or clinical diagnostics applications demand increasingly small amounts of biological material (such as small tissue biopsies) to be analyzed, new methods of preparing such samples for analysis are required. However, specialized equipment for processing of small samples is not free of limitations, such as lower homogenization efficiency, sample loss or operator exposure to potentially hazardous samples.

SUMMARY

In accordance with one or more aspects, a sample preparation device may comprise a tube having an inner surface, a top, and a bottom, the tube configured to contain a sample at the bottom and to be received into a pressure chamber for sample preparation, a cap detachably connected to the top of the tube, and a tapered elongate member extending from the cap into the tube, the tapered elongate member configured to contact the inner surface of the tube and the sample in the bottom of the tube, wherein the tube is deformable such that in operation under pressure the tube is deformed against the tapered elongate member to promote disruption of the sample.

In accordance with one or more aspects, a sample preparation kit may comprise a multi-well plate having an array of wells, each well comprising an inner wall and a bottom, the multi-well plate configured to contain a sample at the bottom of each well and to be received into a pressure chamber for sample preparation, a mat configured to mate with the multi-well plate to form a cap for each well, and a plurality of tapered elongate members extending from the mat into the array of wells, the tapered elongate members configured to contact the inner surface of the wells and the sample in the bottom of the wells, wherein the multi-well plate is deformable such that in operation under pressure the wells are deformed against the tapered elongate members to promote disruption of the sample.

In accordance with one or more aspects, a sample preparation method may comprise introducing a sample to a tube having inner walls, a top, and a bottom, the tube configured to be received into a pressure cycling technology system for sample preparation, detachably connecting a cap to the tube, the cap comprising a tapered elongate member extending into the tube, the tapered elongate member configured to contact the inner surface of the tube and to trap the sample in the bottom of the tube, subjecting the tube to cyclic pressure changes from an elevated hydrostatic pressure P1 to a substantially lower pressure P2 such that the inner walls and the bottom of the tube alternately compress and decompress against the tapered elongate member to promote disruption of the sample, isolating a component from the sample subsequent to pressure cycling, and introducing the isolated sample component to downstream separation and/or analysis equipment.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 18 is a perspective view of a cartridge carrier according to one or more embodiments.

DETAILED DESCRIPTION

Figure 1:
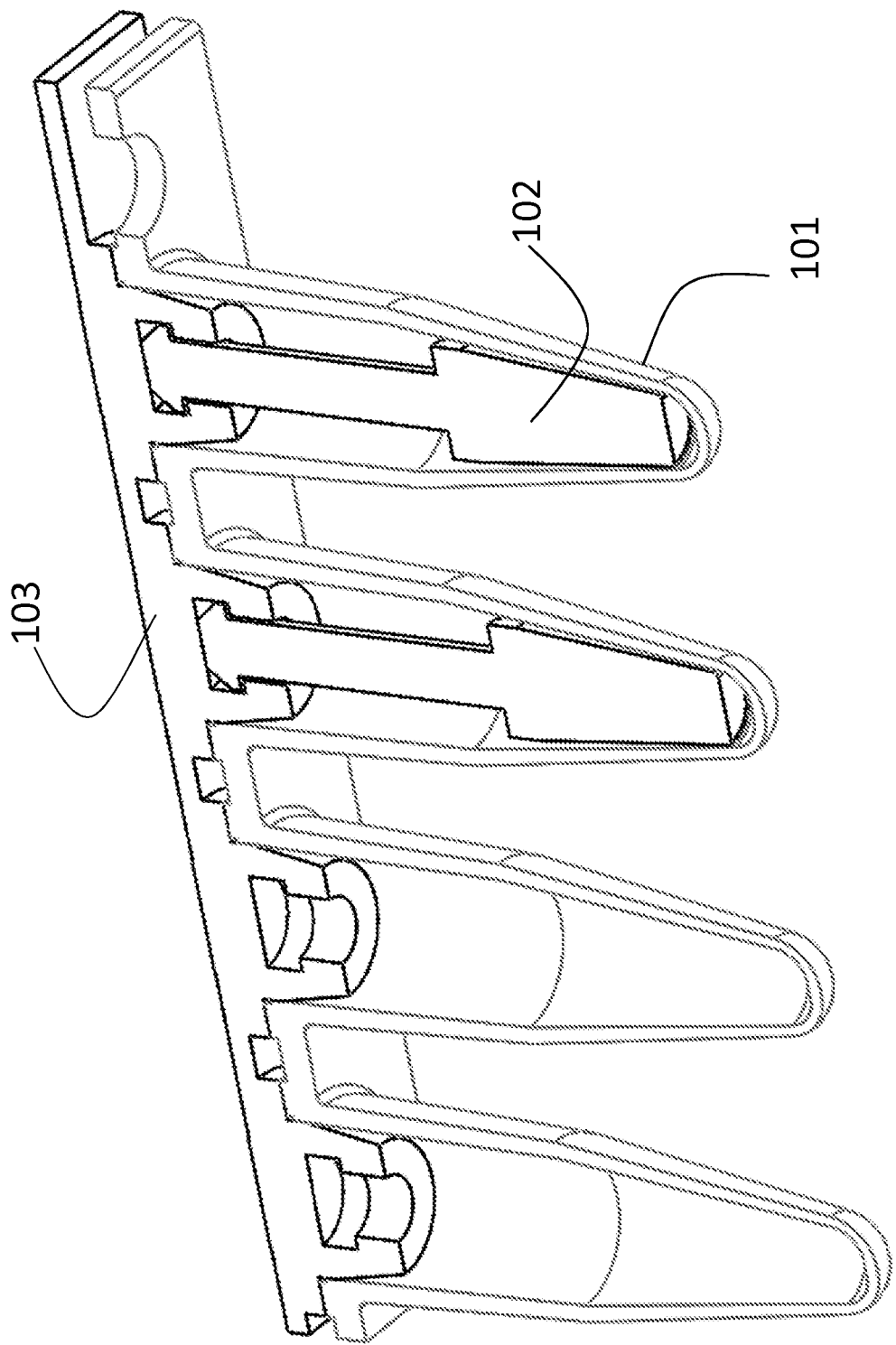
FIGS. 1-2c are representative views in accordance with at least one embodiment.
Figure 2A:
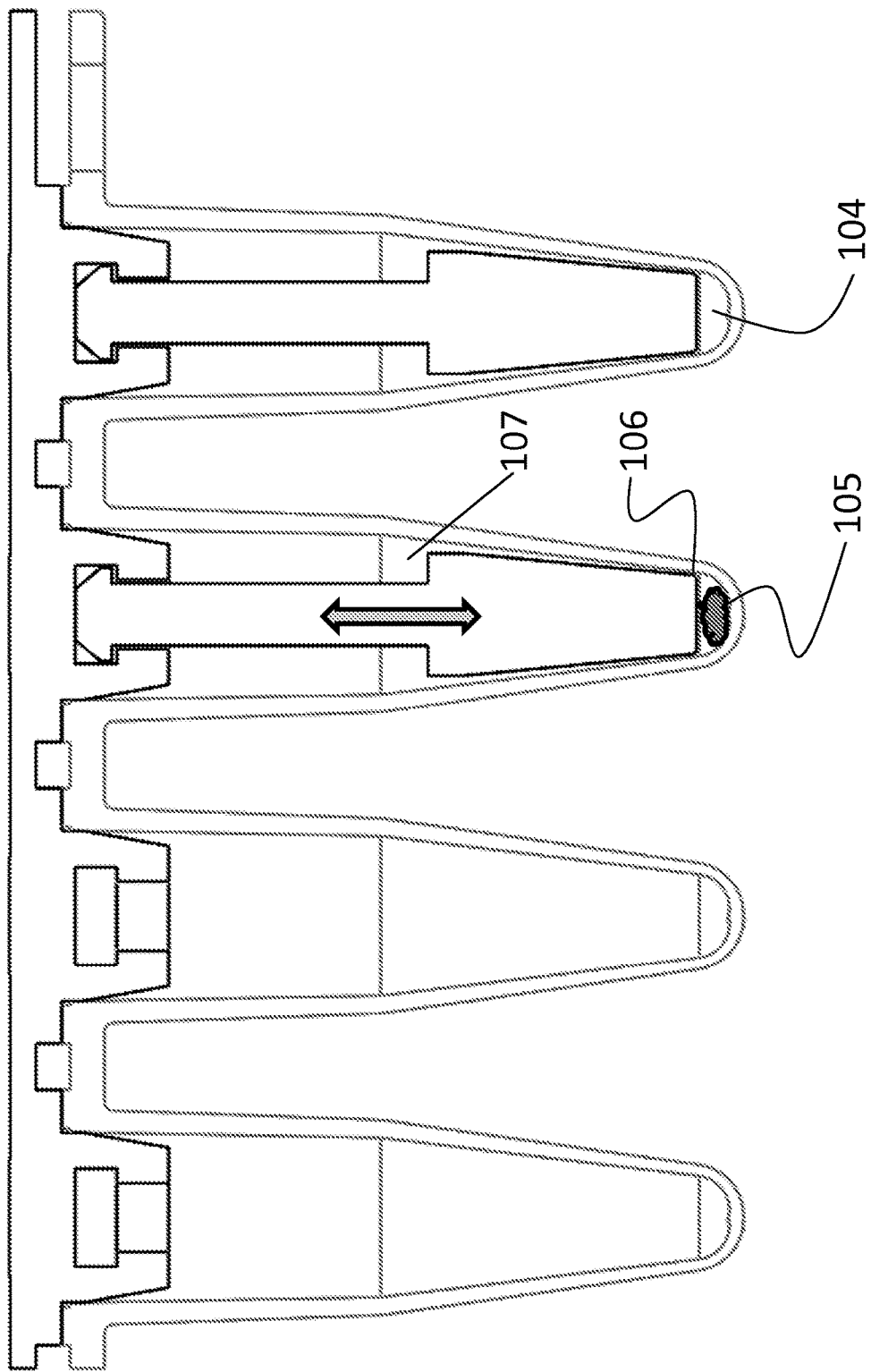
Figure 2B:
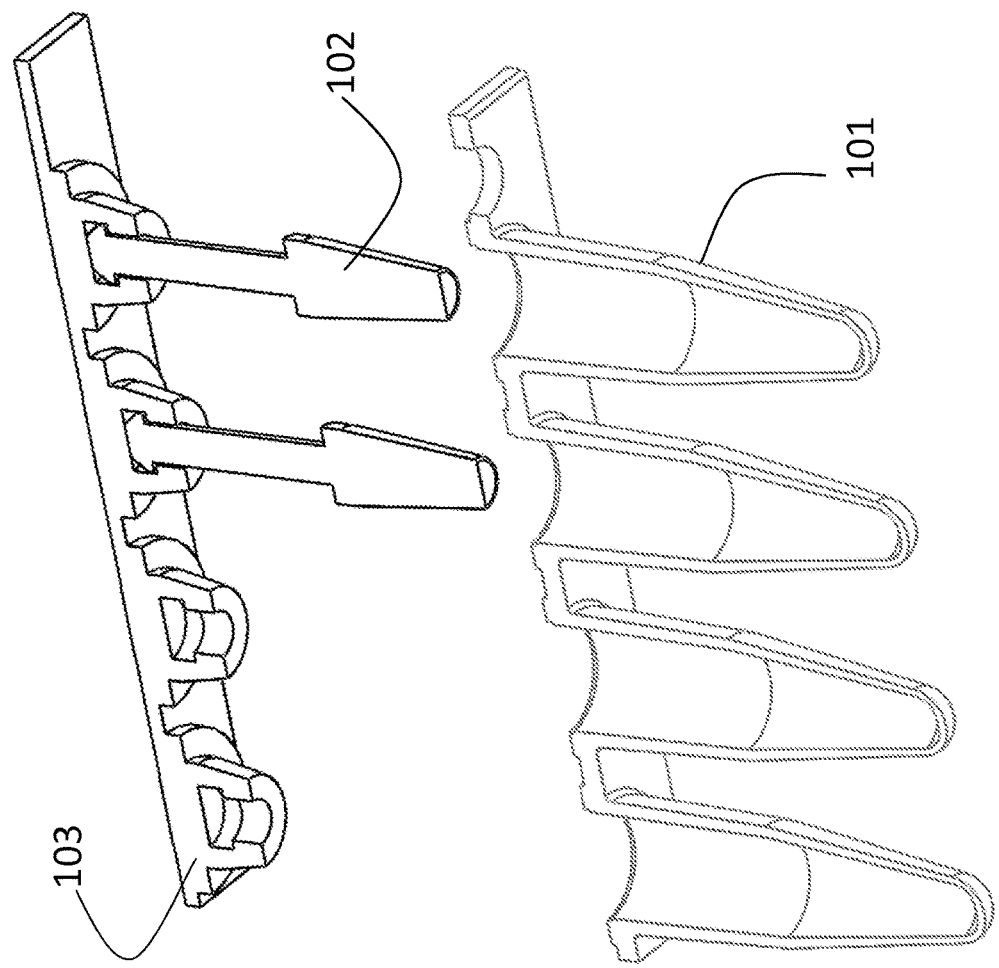
Figure 2C:
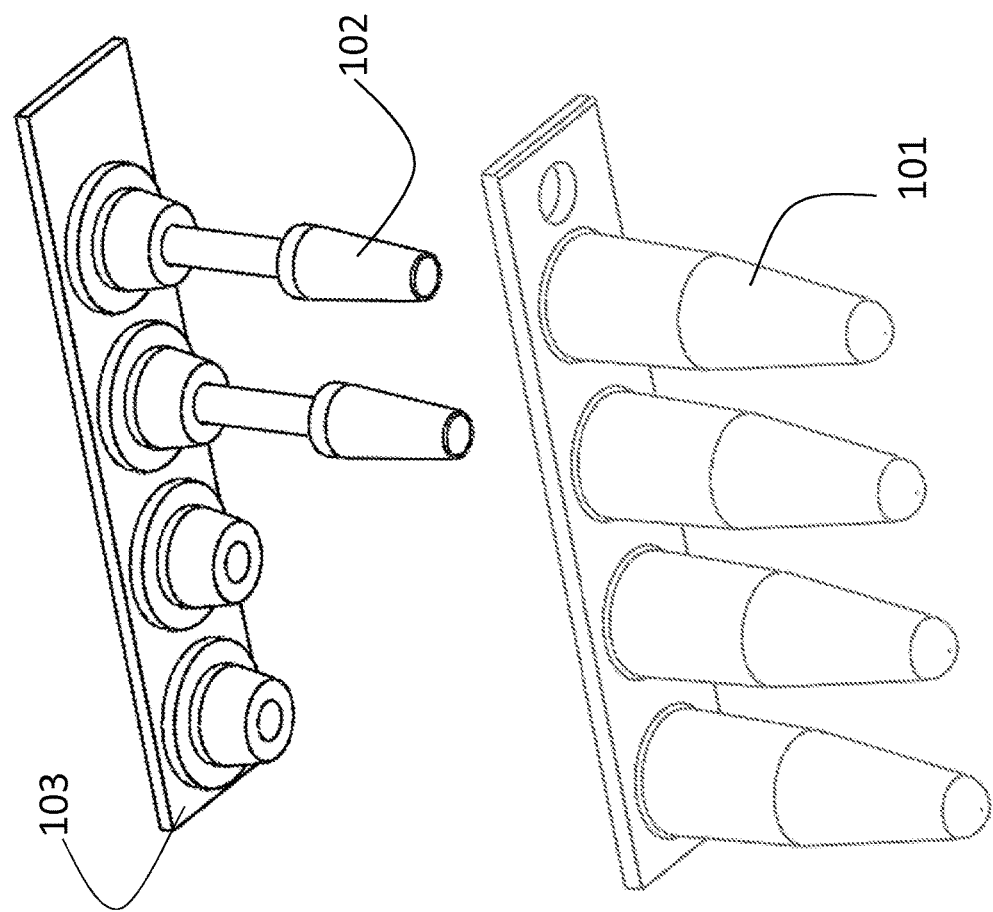

In accordance with one or more embodiments, front-end sample preparation in fields such as genomics, proteomics, transcriptomics, and metabolomics may be facilitated prior to sample analysis. Various embodiments may be used in conjunction with pressure cycling technology (PCT) for sample preparation so as to enhance the extraction of protein, DNA, RNA, lipids and small molecules, as well as molecular complexes (e.g., subcellular organelles, chromatin, polyribosomes, myofibrils, membrane fractions) from solid tissue, especially relatively small samples. In PCT techniques, lysis occurs when samples are subjected to alternating cycles of ambient and high pressure in a hydrostatic reaction chamber. For example, high pressures may be in a range of about 20,000 psi to about 100,000 psi. In accordance with various present embodiments, pressure may compress a non-rigid tubular container around and against a pestle insert, such that the walls of the tubular container move closer to the pestle surface and crush a sample material. The additional mechanical disintegration of sample material leads to a more efficient sample preparation process. In some embodiments, no linear movement, such as an in-and-out motion, or circular movement of the pestle relative to the tubular container is required to promote sample preparation. In at least some embodiments, a Barocycler® PCT machine commercially available from Pressure Biosciences, Inc. may be used to facilitate compression of sample containers that leads to enhanced sample disintegration during sample preparation. In some embodiments, the operator does not manually operate the insert during sample preparation. Downstream, various separation and analysis steps may be pursued. For example, chromatographic separation, mass spectrometry and methods of data analysis may be implemented. In at least some embodiments, sufficient protein may be beneficially released for downstream mass spectrometry analysis from fine needle biopsy samples previously not readily processed in conventional equipment, which leads to sample material losses and cross-contamination. Some embodiments may find use in the fields of biomarker discovery, diagnostics, forensics, drug discovery & design, bio-therapeutics characterization, soil & plant biology, vaccine development, and histology applications.

In accordance with one or more embodiments, hydrostatic pressure and/or mechanical force may be used for deformation. An elongate member such as a pestle either permanently or detachably connected to a cap may facilitate sample preparation. In some embodiments, deformation is by uniform hydrostatic pressure from all sides. In other embodiments, deformation is by pressure from the bottom and/or sides when a cap is fixed against a top cover. In some embodiments, deformation is by pressure from the top through a flexible cap with an attached pestle. The tube may be supported in a rigid well. In still other embodiments, deformation is by mechanical force from the top through a flexible cap with an attached pestle. The tube may be supported by a rigid well. In yet other embodiments, deformation may be via pressure from the top through a flexible cap with an attached pestle.

In accordance with one or more embodiments, a sample may be placed into a sample container, such as a PCT μTube™ commercially available from Pressure Biosciences, Inc. The sample containers may generally be sized and shaped to be compatible with PCT equipment. The sample container may be made of any inert material generally compatible with intended samples and which can generally withstand PCT processing. In at least some embodiments, the containers may be made of a material that significantly contracts under very high hydrostatic pressure. The material may generally be non-rigid. The material may also retain integrity over a wide temperature range, for example, −200° C. to 100° C. Chemical resistance and negligible protein and nucleic acid adsorption help to ensure nearly complete sample recovery which is particularly important for small samples. For example, the containers may be made of fluorinated ethylene propylene (FEP) plastic. In some embodiments, the surface of the container such as the inner surface can be modified to provide selective binding of molecules of interest (such as proteins, nucleic acids or lipids) and facilitate enrichment for said molecules during sample homogenization.

In accordance with one or more embodiments, any sample conducive to the type of sample preparation as described herein may be used. In some examples, the sample may be a polymer material. For example, the sample may be acrylamide or agarose gel. In some embodiments, the sample may be a biological sample. For example, the biological sample can be a plant sample, an animal or microbial cell sample, or a tissue sample. In some embodiments, the tissue sample may be at least one of a heart or skeletal muscle tissue, vasculature tissue, skin tissue, tumor tissue, and a soft tissue. For example, the soft tissue sample may be at least one of liver, spleen, brain, lung, intestine, or stomach tissue. Tissue samples can be extracted from an organism during surgical intervention, by way of punch or needle biopsy, grown in culture, or obtained by fixation and subsequent removal of fixative and storage matrix. Samples may also be obtained by Laser Capture Microdissection from fixed or fresh-frozen pathology slides. Samples can also represent an entire organism (arthropod, nematode, etc.) that fits into the sample container entirely. In at least some embodiments, the sample may be a biopsy tissue sample such as from a small needles biopsy or punch biopsy. The sample may relate to normal or diseased specimen to aid precision medicine. In other embodiments specimens to be homogenized may be dried blood spots on punches of filter paper, swabs containing epithelial cells, forensic swabs containing touch samples, protein or nucleic acid spots/bands punched out of polyacrylamide or agarose gels. The sample may be a solid, gel, semiliquid or suspension.

Relatively small samples may be accommodated by the sample container. For example, a sample size may be less than about 30 mg. In some embodiments, a sample size may be less than 10 mg. In at least some embodiments, sample size may be in the range of about 0.5 to about 3.0 mg. In still other embodiments, a sample size may be only one or several cells. In addition to the accommodation of small sample size, sample loss may be minimized. The generation of heat and/or high shear stresses may also be avoided to preserve the integrity of extracted components.

In accordance with one or more embodiments, one or more reagents may then be introduced into the sample container. A pipette may be used for this purpose. Relatively low extraction reagent volumes may be used, for example, as low as about 20 μL to about 30 μL. A wide variety of reagents may be implemented. The reagent may be, for example, any reagent commonly used for extraction of proteins such as RIPA buffer, urea buffer, guanidine-HCl buffer, phosphate buffered saline, or organic solvents. The reagent may also be any reagents used for extraction of DNA and/or RNA, such as guanidine-HCl, phenol, or detergents. Other buffers and reagents, such as Tris, Tris-EDTA (TE), and ammonium bicarbonate may also be used. In some embodiments, specific inhibitors of endogenous enzymatic activity may be added to the extraction buffer prior to sample disintegration to protect sample components from exposure to, and damage from, released endogenous enzymes during the process or upon completion of the sample disintegration and lysis.

In accordance with one or more embodiments, one or more enzymes may be introduced to the sample container. The enzymes may be naturally occurring or synthetically designed. Representative enzymes may include trypsin, PNGase F, Endoproteinase Lys-C, Chymotrypsin, and Endoproteinase Glu-C. Representative enzymes may also include Endoproteinase Asp-N, Endoproteinase Arg-C, pepsin, and papain, for example.

Reagents may also include enzymes for concomitant digestion of certain sample components. In some embodiments, the enzymes may be DNase enzymes for digestion of DNA in the sample, or RNase enzymes for digestion of RNA. In some embodiments, the enzymes may be benzonase endonuclease, or general protease enzymes such as Pronase or Proteinase K, for digestion of unwanted proteins. In still other embodiments, the enzymes may be specific protease enzymes such as trypsin for isolation of sample peptides, or enzymes for lysis of bacterial and fungal cell walls, such as lysozyme and zymolase.

In accordance with one or more embodiments, at least some volume of air may be left in the container above the sample so as to provide for compressibility that allows sufficient deformation of the tube as discussed herein. When the sample container is properly filled, a sample material and reagent may fill about ⅔ of the container. The remaining ⅓ of the sample container may be filled with residual air.

In accordance with one or more embodiments, an elongate member may then be introduced to the filled sample container to facilitate effective disruption of soft tissues to augment cell lysis via pressure-driven mechanical disintegration. In some non-limiting embodiments, the elongate member may generally be tapered, for example, so as to resemble a pestle. Various sizes and shapes may be implemented as discussed herein. The elongate member may be made from any material. In some embodiments, the elongate member may be made from an inert material. In some embodiments, the elongate member may comprise a component to specifically bind a sample component of interest to, for example, enrich or purify the sample. The material should generally be relatively harder than the sample so as to cause disruption thereof during sample preparation. The material may also be relatively equal to or harder than the non-rigid container for the same purpose in some embodiments. In at least some non-limiting embodiments, the elongate member may be made of polytetrafluoroethylene (PTFE), for example, Teflon® commercially available from DuPont Corp. A manual tool or robotic manipulator may be used to insert the elongate member into the sample container. The elongate member may be integral to or detachably coupled to a deformable cap for the sample container.

In accordance with one or more embodiments, one or both of the sample containers and elongate members may generally be intended for single use. One or both may therefore be disposable, such as a consumable. One or both may be provided individually in bulk. Alternatively, an array of one or both may be provided such as in a rack. For example, a plurality of sample containers and/or elongate members may be provided in a standard format, such as a 96 unit rack, compatible with standard sample preparation and analysis equipment for ease of use. In some embodiments, the sample containers may include a writeable surface.

In accordance with one or more embodiments, the filled sample container including the inserted elongate member may then be placed and secured into a PCT chamber. In some embodiments, a plurality of sample containers may be placed into a PCT cartridge for multi-sample processing. The cartridge may then be placed into the PCT chamber. A PCT program may then be run on the PCT equipment. In some embodiments, the PCT program may involve cyclic pressure changes from an elevated hydrostatic pressure P1 to a substantially lower pressure P2. In at least some embodiments, the PCT equipment may be a Barocycler® as noted above. In at least some embodiments, the PCT equipment and/or PCT program and/or sample containers may be in accordance with what is described in any of U.S. Pat. Nos. 6,111,096; 6,120,985; and 7,626,017, as well as US Publication No. 2010-0281955-A1, all assigned to Pressure Biosciences, Inc., the entire disclosures of which are hereby incorporated herein by reference in their entireties for all purposes.

Upon completion of the PCT program, the PCT chamber may be opened and the homogenized samples may be retrieved for further processing, separation, extraction and/or analysis. The homogenized samples may comprise a structure different from the structure of the original sample material. In some embodiments, the intercellular matrix and its connections may be broken down. In some embodiments, the cellular membranes may be disrupted, so as to release components such as proteins, lipids, membranes, organelles, bacteria, viruses, and nucleic acids into the solvent or extraction reagent.

In at least some embodiments, a PCT adapter workstation may be used for simplified handling. A kit may be ergonomically designed and include tools and hardware to enable a user to process multiple samples at a time. For example, a PCT cartridge or sample holder as noted above may be assembled to receive one or more sample containers. The cartridge may carry stacked arrays and allow for identification of samples by their unique position based on array and/or level. The cartridge may wedge the cap into the top portion of the tube and the top portion of the tube into the well to ensure the tight seal of each tube even when tube deformation happens under compression by hydrostatic pressure. A kit may include, for example, one or more sample tubes and one or more elongate members. The kit may also include other components such as a source of reagent and/or enzyme.

In operation, a sample may be trapped by an end of the elongate member at the bottom of a sample container. The sample may be crushed on every pressure cycle due to the contraction of the sample container as described further herein onto, around, and/or against the elongate member. This mechanical action, combined with the extraction ability of the buffer under high pressure, results in effective homogenization and extraction. At high hydrostatic pressures, air is fully dissolved into water as well which may also facilitate sample preparation.

One or more embodiments may be used as an alternative to or used with high energy mechanical disruptive processes such as homogenization, ultrasonic cavitation (sonication), and vibrational bead beating. In some embodiments, the devices and methods presented herein may combine the mechanical crushing force of a sample being pressed between rigid surfaces with repeated extrusion through a narrow annular gap due to the relative shapes of the sample container and the elongate member that results in specimen homogenization in the enclosable container that is equivalent to or superior to sample disintegration by conventional methods.

In accordance with one or more embodiments, the use of a fully enclosable single disposable container which can be used from sample collection, to mechanical disruption, to extraction will guarantee sample integrity, chain of custody, prevent contamination, and protect the user from potentially hazardous sample material exposure. Various devices and methods are discussed herein for generating linear motion between an elongate member insert and sample container while keeping the sample tightly sealed for the extraction of biological sample components via a controlled mechanical disruption action.

In accordance with one or more embodiments, samples may be prepared for analysis in a closed system using the disclosed devices and methods for extraction. In some embodiments, a lysis or an extraction buffer is added to the sample container prior to sample preparation. The selection of a lysis or extraction buffer may be based on a desired analytical application. For example, an extraction buffer may be selected based on its validation for sample preparation for enzyme-linked immunosorbent assay (ELISA) or Western Blot. In some embodiments, samples may be mashed, homogenized, pureed, macerated, mixed, muddled, or otherwise subjected to mechanical manipulation for other purposes.

The sample is homogenized and components are extracted via a controlled mechanical disruption action. In some embodiments, the controlled mechanical disruption action may be created by a forced displacement of an elastic cap with a relatively hard insert attached. The insert may be an elongate member as described herein. The insert may be described as a piston, plunger, rammer, reamer, masher, mallet, impinger, pestle, or disrupter in various embodiments. The insert may have a first end attached to a cap, and a second end configured to contact a sample for preparation. The cap may seal the sample container to isolate the sample media from the surrounding pressure and environment. In some embodiments, the cap may be elastic so as to accommodate linear deformation resulting from hydrostatic compression. In at least one embodiment, the cap may be part of the insert. In other embodiments, the motion may be created by pressure induced contraction of a sample well which may bring the bottom of the well into contact with a tip of the insert. The force can be applied once or repeatedly, such as in one or more pressure cycles, to optimize the desired level of sample disruption. The sample well may be referred to as a container, vessel, holder, or tube in various embodiments. In some embodiments discussed herein, the sample well may be made of an elastic or deformable material. In some embodiments, the elastic modulus of the sample well is about 80,000 psi to 100,000 psi. In other embodiments, it may be a semi-rigid or rigid material. For example, the sample well may be polytetrafluoroethylene (PTFE) or fluorinated ethylene propylene (FEP). The sample well may be harder than the sample material. For example, the sample well may have a hardness of at least Rockwell R 55.

The insert may generally be made out of any material harder than the sample. In some embodiments, the insert may be made out of a hard material such as a metal alloy like stainless steel, glass, ceramic, or Teflon®. An alternative embodiment may involve inserting a hard object or grit into the wells so as to increase the hardness of the surface working with a hard insert. In some embodiments, inserts may be considerably smaller in diameter and may be suspended from a flexible membrane in a sample container. A member above the cap or sheet of caps such as a membrane or mat may apply pressure in a circular motion along the inner circumference of the membrane to create an oscillatory motion in a horizontal plane. In other embodiments, a member above the cap or sheet of caps such as a membrane or mat may apply pressure in a reciprocal vertical motion such as to transmit the same motion onto the elongate member within an enclosed container.

After the sample has been homogenized, extracted components may be transferred to downstream analysis methods for detection and quantization of cellular and tissue components, pharmaceuticals or environmental pollutants and their metabolites. In some embodiments, downstream analysis of extracted components can be performed using gel electrophoresis, Western Blotting, enzyme linked immunosorbent assay (ELISA), chemical affinity or immunoaffinity enrichment. In some embodiments, downstream analysis of extracted components can be performed using chromatography (e.g., thin layer chromatography, gas chromatography, and high performance liquid chromatography), microarrays, mass spectrometry or tandem mass spectrometry (e.g., liquid chromatography-mass spectrometry, and liquid chromatography-tandem mass spectrometry). In some embodiments, downstream analysis of extracted components can be performed using polymerase chain reaction and short tandem repeat.

In some non-limiting embodiments, disposable inserts may be held by a flexible cover mat (typically silicone or like material) in a desired array (typically 9 mm spacing). The mat may serve as a cap for a plate of arrayed sample wells. When the mat is subjected to a pressure or force, the mat may deform and push the inserts further into associated wells resulting in an action that homogenizes the content within each well. In some embodiments, the wells may be supported within a holder with individual cavities matching the profile of each well. The holder may be made from a rigid material such as plastic or metal. In some embodiments, the metal may be corrosion-resistant. For example, the metal may be at least one of brass, stainless steel, and aluminum. The purpose of the holder is to support the wells and prevent tearing of the well walls and to facilitate an interference fit between the container and the cap and maintain a seal during deformation of the container, the cap, or both. In some embodiments, no holder may be present.

In some preferred embodiments, the position of the well holder may be fixed and a force or pressure may be applied to the top of the mat resulting in the deflection of the mat and in turn the downward motion of the insert. The downward force may be provided by the arm of a liquid handling robot. In other embodiments, the top plate may be fixed and the well or well holder may instead be moved.

In still other embodiments, both the top plate and the well holder may be kept stationary and the holder may be pressurized so that each well is collapsed in the radial and axial directions. This will also result in the reduction of space between the tip of the insert and the bottom of the well. In some embodiments, very high hydrostatic pressure, for example about 10,000 psi or greater, for example, 20,000 psi or greater to enhance extraction may be applied. The minimum pressure applied to the sample container may depend on a property of the specimen. For example, the minimum pressure applied to the sample container may depend on the hardness of the specimen. The minimum pressure applied to the sample container may depend on the composition of the sample container and the insert. In some embodiments, the minimum pressure may be 5000 psi. The maximum pressure to be applied to the sample container may depend on the technical specifications of the equipment. In some embodiments, the maximum pressure may be 100,000 psi. In some embodiments, maximum pressure may be applied to all samples unless partial homogenization is required. In still other embodiments discussed herein, the insert may be expanded so as to cause the mechanical disruption of the sample.

In accordance with one or more embodiments, a sample preparation process may be carried out in isolation and in a sample container array compatible with modern fluid handling equipment. For example, sample containers may be arranged in an array spaced about 9 mm apart, as measured center-to-center. This is compatible with the ANSI-SBS standard for microtiter plates. In some aspects, the techniques may involve mechanical disruption of a sample without rotation. Sample preparation and subsequent extraction for analysis may all be conducted in a closed or sealed vessel, substantially isolated from its environment.

In accordance with one or more embodiments, the tube spacing and array configuration may be modified as needed for a specific situation. For example, instead of a rectangular array with 9 mm spacing, a round array with some other spacing can be used.

Such techniques can be applied to a large number of samples at once for high throughput processing. For example, samples arrayed in industry standard formats like the 96 well PCR plates can be processed. In some embodiments, a 96 well American National Standard microplate may be used. The outside dimension of the base footprint, measured within 1.7 mm of the outside corners may be about 127 mm in length and about 85 mm in width. The four outside corners of the plate's bottom flange may have a corner radius of about 3 mm to the outside. As noted above, the wells may be arranged in an array spaced about 9 mm apart, as measured center-to-center. Disclosed mechanisms are capable of extracting protein, DNA, and other analytes including RNA and lipids from biological samples of interest. Notably, the rotating action of a traditional mortar and pestle is not essential in accordance with various embodiments. Nor is linear motion in certain embodiments.

The generation of heat and/or high shear stresses may be avoided to preserve the integrity of extracted components. In some embodiments, the temperature of the process is actively maintained by a jacket, peltier, or other type of cooler. In some embodiments, the jacket may contain water, antifreeze, or any other liquid. In the pressure cycling process, adiabatic heat generation due to the compression of water and samples being submerged in water is relatively low. For example, if the process is carried out at room temperature and water is used as the pressure media, adiabatic heat generation may be between about 1° C. to about 20° C. In contrast, in typical mechanical means of sample homogenization, the kinetic energy of the equipment is converted to internal energy, or heat, of the sample. Similarly, ultrasonic homogenizers use cavitational energy to disrupt sample components. Cavitation also turns kinetic energy predominantly into heat. In both traditional mechanical means of sample homogenization and cavitation, samples may reach up to 100° C. if they are not intermittently cooled.

In some embodiments, as shown of FIGS. 1 and 2a-2c, a small specimen 105 to be disrupted is confined in a narrow cavity 104 formed between the bottom of the sample container 101 and the insert member 102 until it is extruded through an annular gap 6 between the insert member and the container walls into the space 107 above the insert member. This process can be driven by reciprocal motion of the insert member in a vertical dimension, as shown in FIG. 2. The insert member is attached to the deformable cap material 103 that is sufficiently flexible for such motion to occur. In some embodiments the motion of the insert can be facilitated by the mechanical force applied to the flexible cap. In other embodiments, the entire enclosed container with sample, extraction solution and the residual air can be placed into a hydrostatic pressure vessel and subjected to alternating cycles of hydrostatic pressure. The flexible deformation of the membrane cap 103 resulting from a pressure differential inside and outside of the specimen container results in a reciprocal movement of the insert member inside the specimen container, while the container remains tightly closed.

Figure 3:
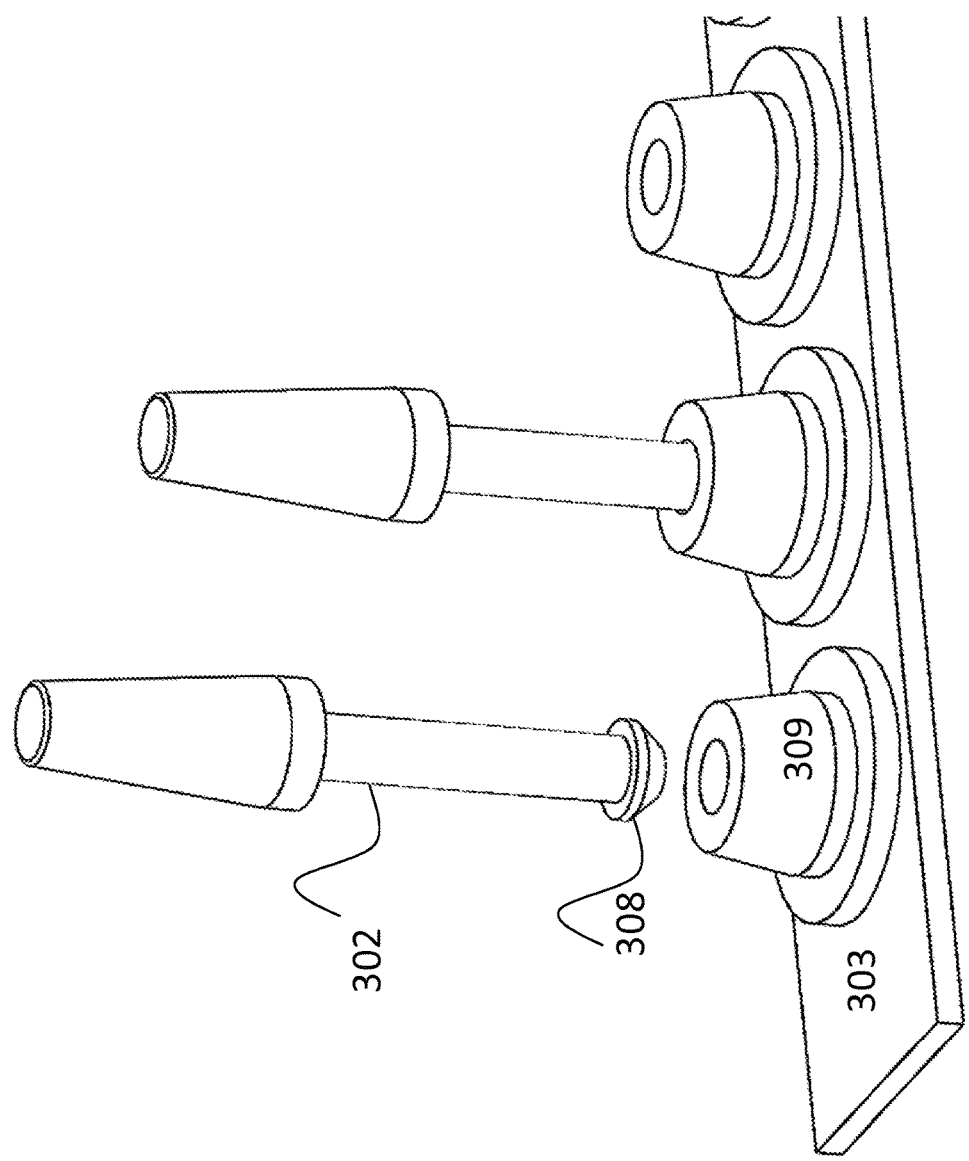
FIG. 3 is a perspective view in accordance with at least one embodiment.

In some embodiments, as shown in FIG. 3, an insert holder 309 is attached to a deformable cap material 303. Insert holder may be shaped and sized to accept and hold insert nub 308 at a proximal end of insert member 302.

In other embodiments, as shown in FIGS. 4 and 5, the sample container is closed with a non-deformable cap that extends into said container and comprises the insert member. When the closed tube is subjected to high hydrostatic pressure, the tube deforms and its dimensions become smaller. Dimensions of the insert member, made of less compressible material, remain relatively unchanged. As a result of this axial motion of the tube relative to the insert member, sample material is compressed between the insert member and the tube walls and extruded through the resulting annular gap as described above. The presence of air in the tube results in greater compression of the tube relative to the insert member, leading to greater extent of mechanical motion and sample homogenization. In other embodiments, alternatively shaped insert body comprises a recessed area to allow more air to remain in the closed tube. FEA computer simulation of the tube compressed from the outside (FIG. 6) confirms that the axial contraction and expansion is a preferred deformation of the tube in alternating hydrostatic pressure conditions. Compressibility or other parameters specific to the tube design and material may impact the nature of the deformation.

Figure 4A:
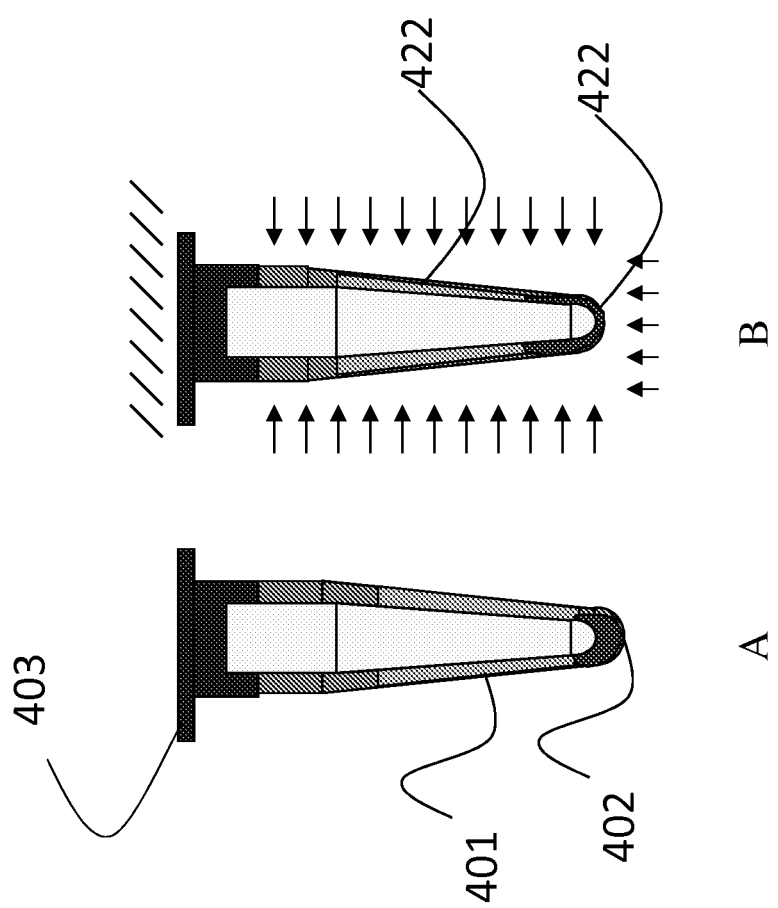
FIGS. 4a and 4b are side views in accordance with at least one embodiment when subjected to hydrostatic pressure from all sides excluding the supported top cap.

FIG. 4a presents a schematic involving partial contraction due to the application of hydrostatic pressure. Upon application of pressure, the walls of sample container 401 compress to compressed sample container 421. In addition, sample 402 is crushed against the wall to produce homogenized sample 422.

Figure 4B:
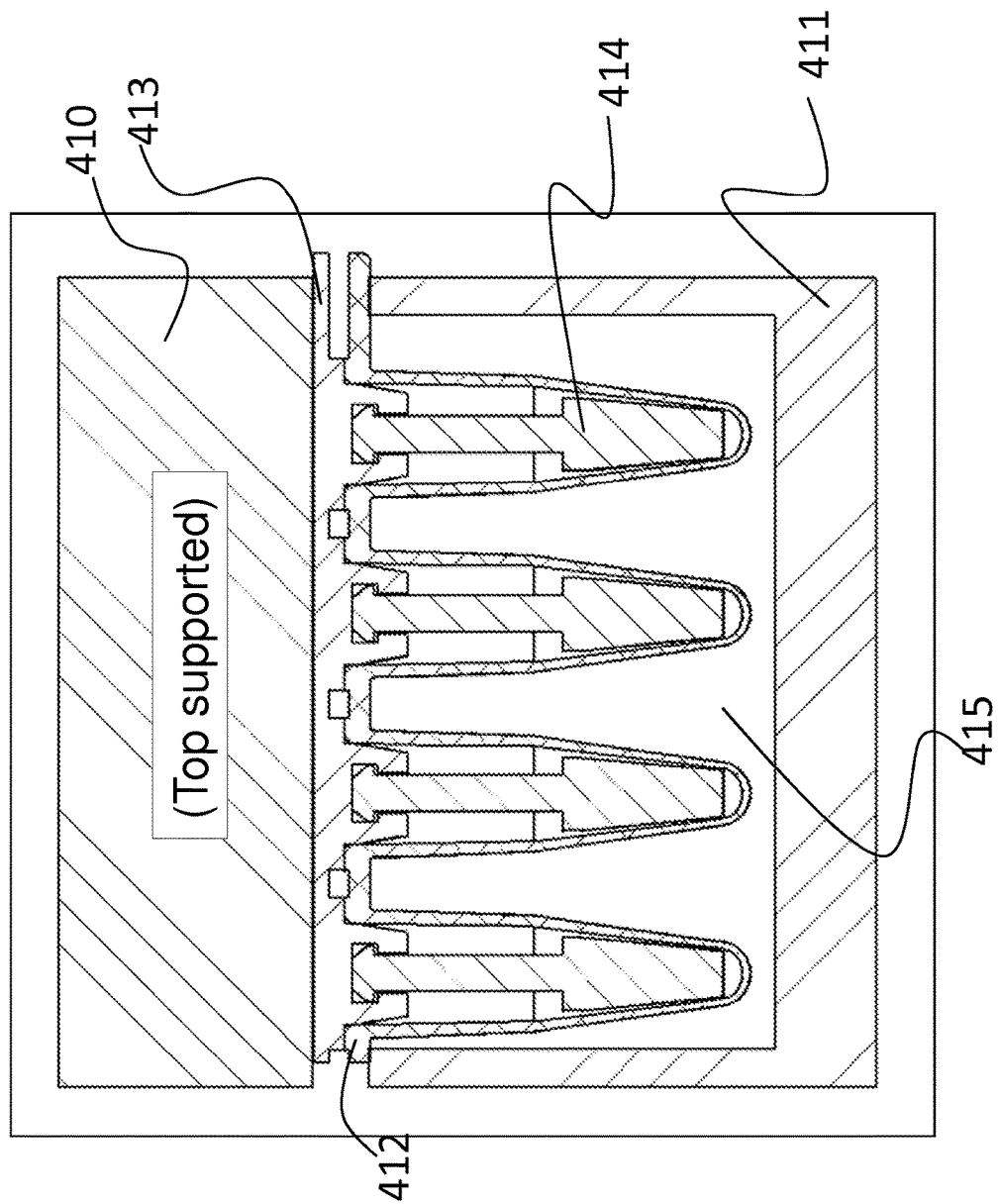

FIG. 4b presents a schematic involving partial contraction due to the application of hydrostatic pressure. Hydrostatic pressure on the lower portion of the well causes the radial contraction of the well, axial contraction of well length and the movement of the sample up against and past the insert. Each specimen is placed into individual deformable wells of a multi-well sample container 412. Subsequently, the array of wells is closed with a container cap array 413 containing attached rigid inserts 414 that protrude into each well. After sealing of each well is established, entire multi-well container is placed into the hydrostatic pressure chamber 411 and closed with the rigid chamber lid 410. Pressurized fluid is then directed into the pressure chamber 415, surrounding the sample wells, causing compression of sample well walls against the rigid insert, leading to specimen crushing and homogenization. The process can be repeated multiple times, if necessary. In this embodiment the cap array is not being significantly deformed as it is supported against the rigid lid.

Figure 5A:
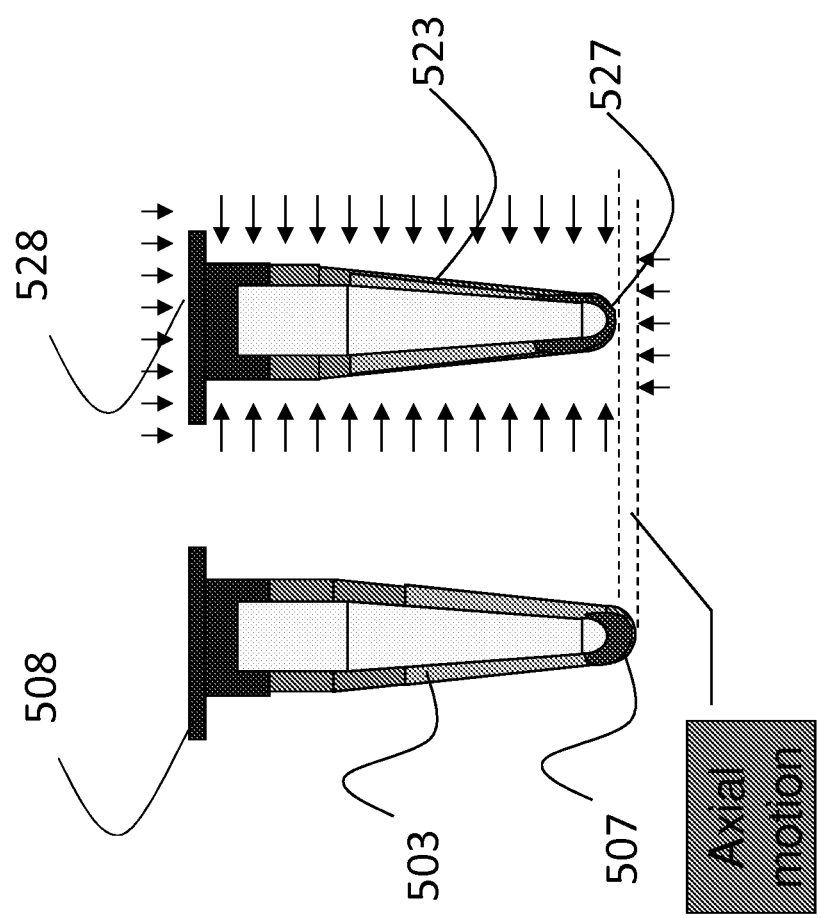
FIGS. 5a and 5b are side views in accordance with at least one embodiment when subjected to uniform hydrostatic pressure in every direction with respect to the sample.
Figure 6:
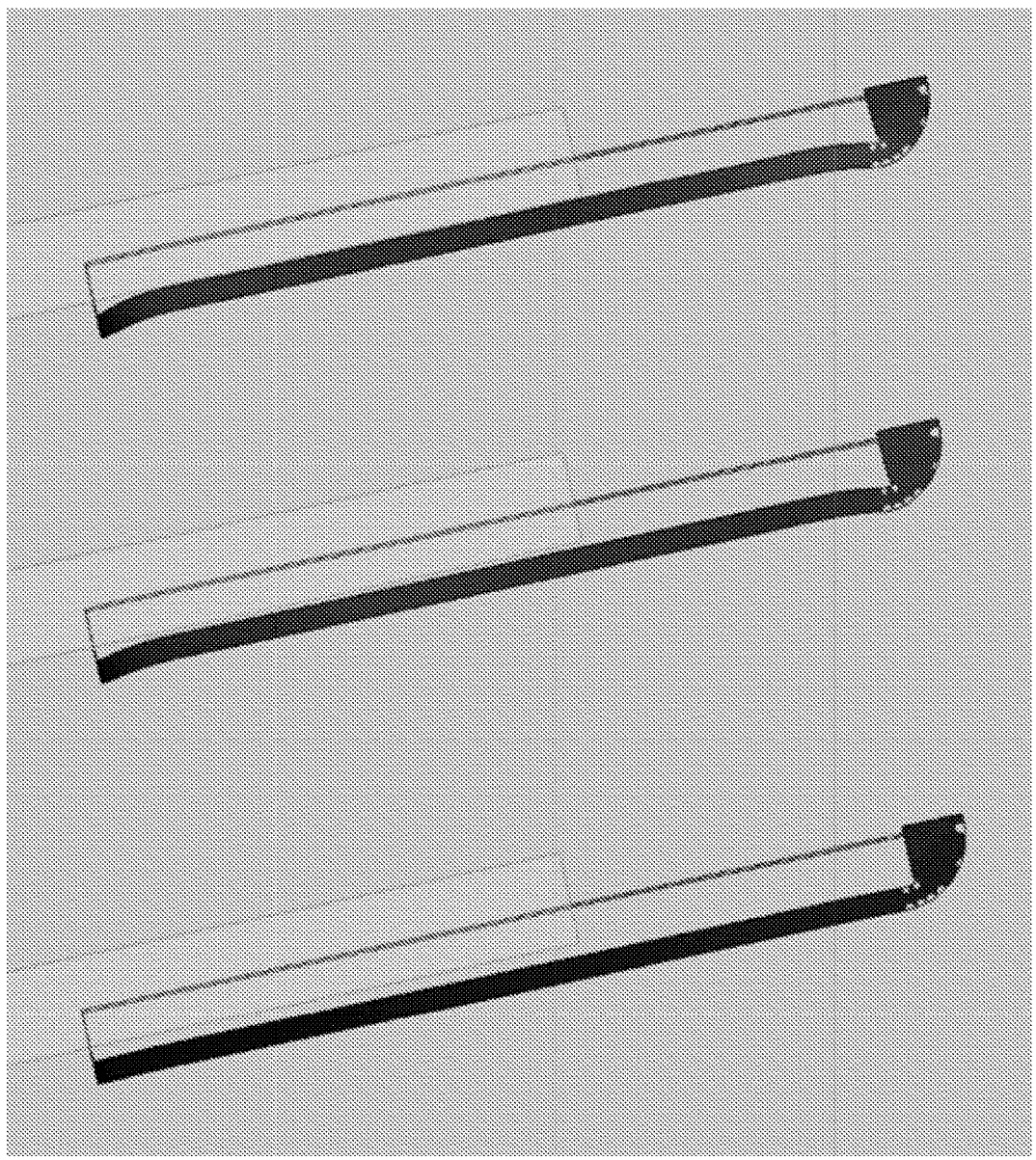
FIG. 6 is a computer-generated model demonstrating container deformation induced by hydrostatic compression in accordance with at least one embodiment.

FIG. 5a presents a schematic involving uniform hydrostatic contraction. Upon application of pressure, the walls of sample container 503 compress to compressed sample container 523 and the cap deformable cap 508 compresses to compressed deformable cap 528. In addition, sample 507 is crushed against the walls to produce homogenized sample 527.

Figure 5B:
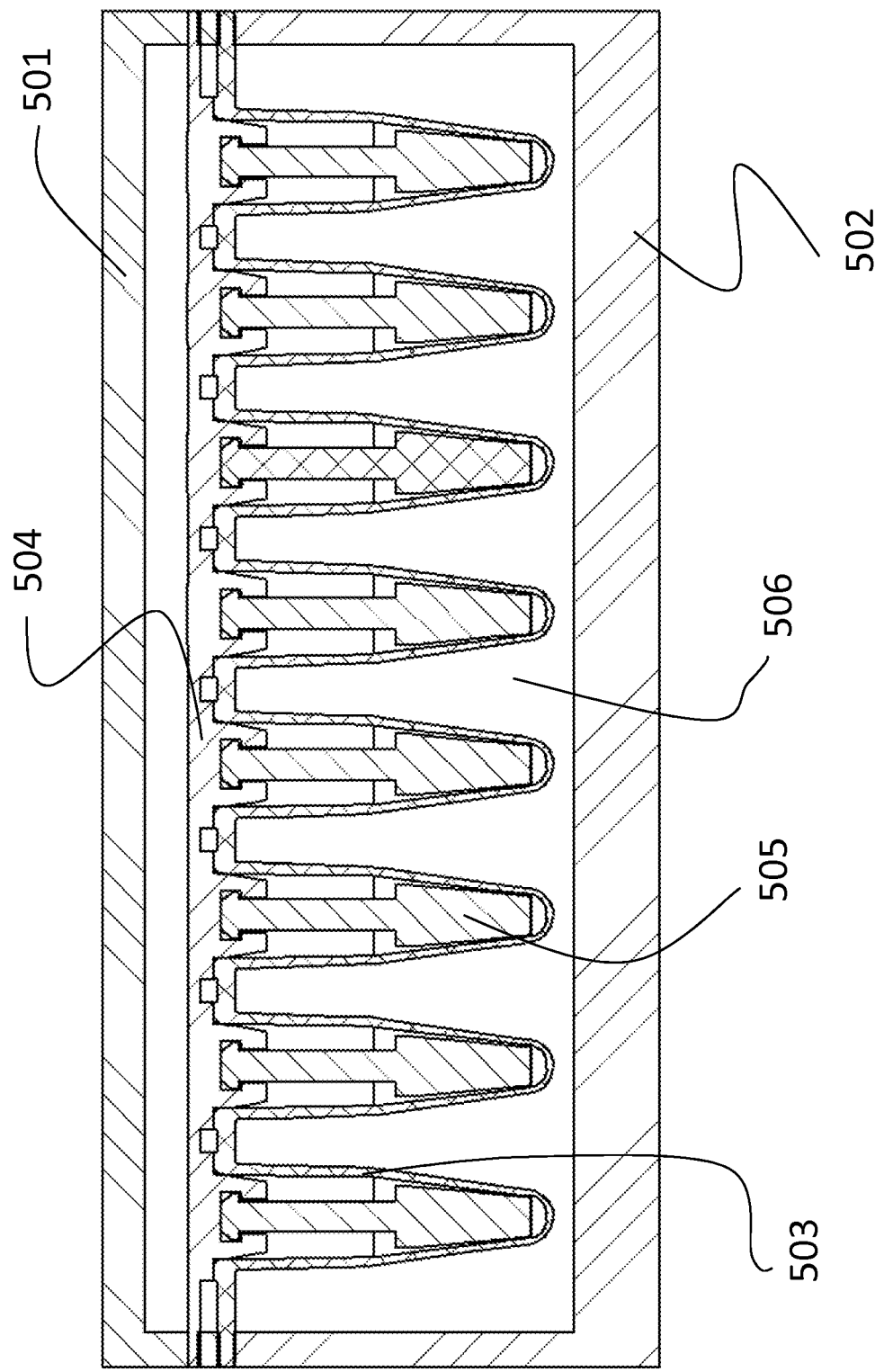

FIG. 5b presents a schematic involving uniform hydrostatic contraction. Each specimen is placed into individual deformable wells of a multi-well sample container 503. Subsequently, each well is closed with a deformable container cap array 504 containing attached rigid inserts 505 that protrude into each well. After sealing of each well is established, the entire multi-well container is placed into the hydrostatic pressure chamber 502 and closed with the chamber lid 501. Pressurized fluid is then directed into the pressure chamber 506, surrounding the sample wells, causing compression of sample well walls against the rigid insert, leading to specimen crushing and homogenization. Additionally, the hydrostatic pressure above the container cap array causes the individual caps to deform inward into each well and further homogenize the specimens. The process can be repeated multiple times, if necessary.

In some embodiments, an insert may pass through a cap and be sealed by compression, i.e., a septum. This would allow the addition of a rotating action to the process since the insert could then move independently of the cap.

Figure 7A:
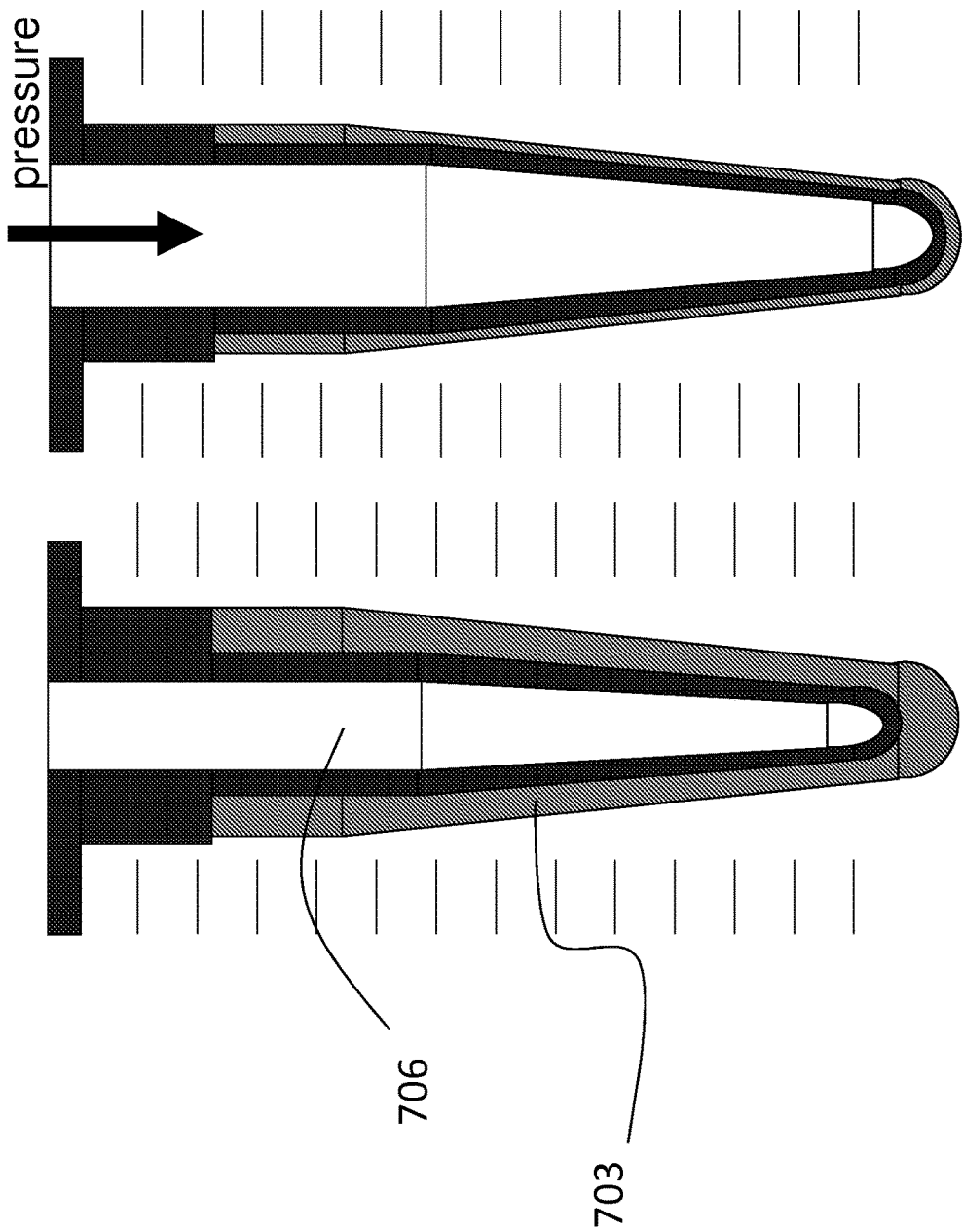
FIGS. 7a and 7b are side views of a contracted and an expanded inserts according to at least one embodiment.
Figure 7B:
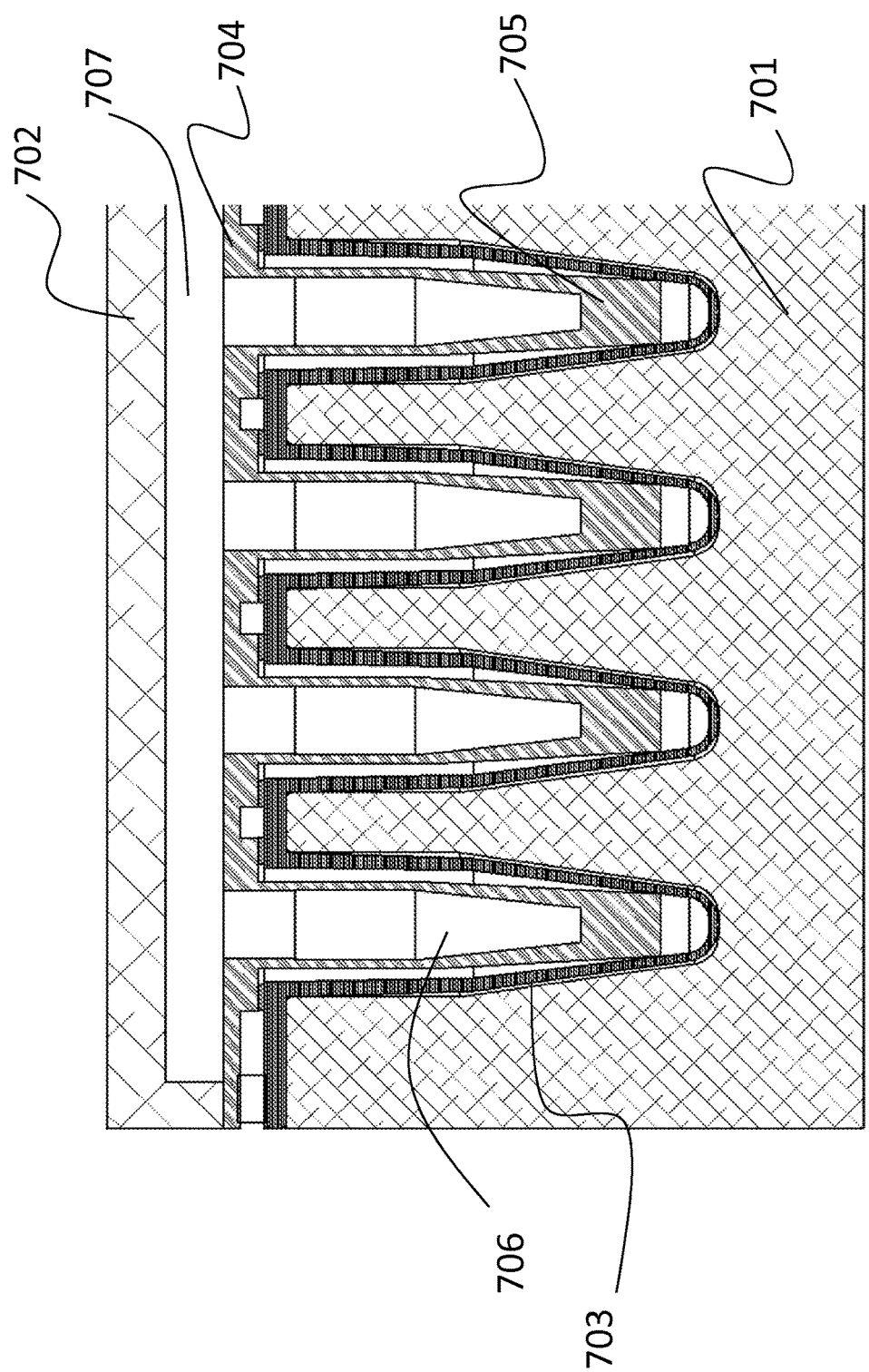

FIGS. 7a and 7b present an embodiment involving an expanding insert. A combination cap/insert component can be inflated by pressure to radially expand. This may crush a sample between the insert and the wall of the well. The well may be supported so that it cannot move. Use of a combination cap (704) and insert (705) component which can be inflated by pressure to undergo axial and radial expansion. Expanding the insert will crush a sample between the insert and the wall of the well. The well walls (703) will be supported against a rigid block (701) so they cannot move outward. Inflation is mediated by fluid or gas entering the insert internal cavity (706) via the manifold (707) in the module cover (702).

In accordance with one or more embodiments, devices may integrate with multiple downstream reaction steps, for example, reduction, alkylation, and enzymatic digestion after a sample is homogenized. The homogenized sample may remain in the sample tube, while caps including elongate members of decreasing size such as length can be used to provide more room for step-wise addition of required reagents.

The function and advantages of these and other embodiments will be more fully understood from the following non-limiting examples. The examples are intended to be illustrative in nature and are not to be considered as limiting the scope of the embodiments discussed herein.

EXAMPLES

Example 1: Optimal Insert Shape

Kidney tissue samples were placed in sample containers for analytical preparation. About 3-6 mg of kidney tissue sample was placed in each of 8 sample containers. The sample containers were placed in a water-filled chamber that was pressurized at 20,000 psi for 10 cycles. Each cycle comprised 20 seconds at 20,000 psi followed by 10 seconds at atmospheric pressure. The extent of tissue disruption was assessed visually. As shown in FIG. 8b, undisrupted tissue pieces are dark and remain at the tube bottom. Disrupted tissue homogenates appear paler and are distributed along the walls of the tubes.

Figure 8A:
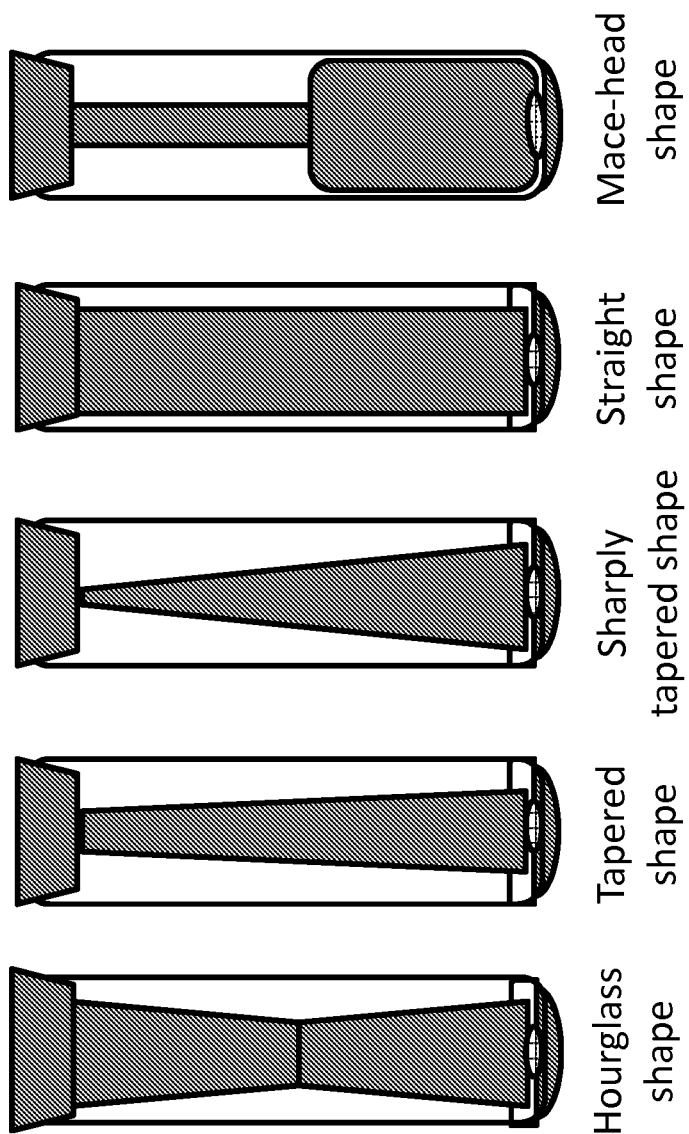
FIG. 8a is a side view of different insert shapes according to various embodiments.
Figure 8B:
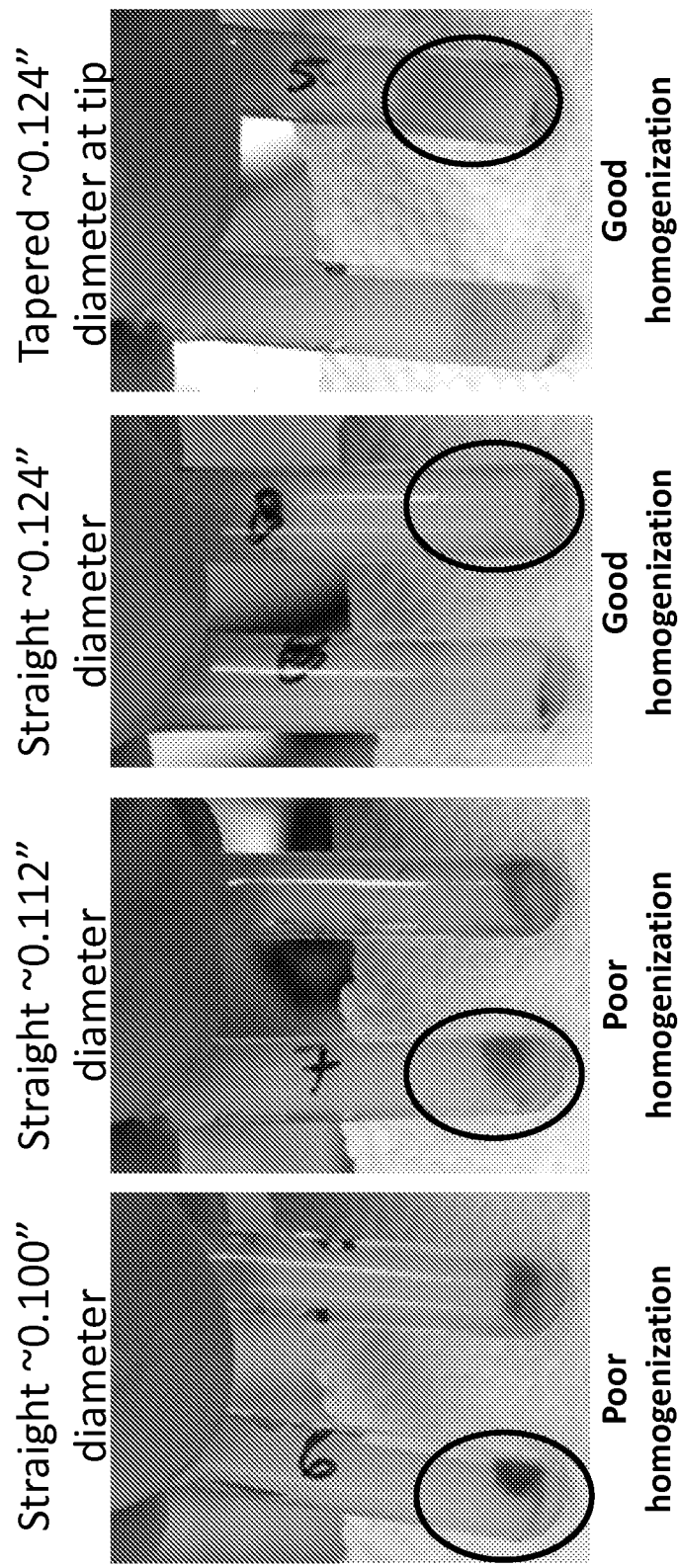
FIG. 8b features four sample homogenization results according to aspects of the invention.

As shown in FIGS. 8a and 8b, at least several insert shapes may be used. As shown on FIG. 8b, the effect of gap size on the extent of sample homogenization was assessed. The sample tube inner diameter was kept constant at 0.125". The amount of clearance between the insert and tube walls was changed by varying insert diameter. Using straight inserts of 0.100", 0.112" and 0.124" diameter demonstrated that a tight fit between the insert and tube wall was necessary for good tissue disruption. Comparison of inserts of different shape with the same tip diameter confirms that the sample extrusion through the annular gap between the insert and the tube wall contributes significantly to the homogenization mechanism. This experiment also demonstrates that in this design, the diameter at the tip is the important factor. Using a tapered insert has the added advantage that the available sample volume inside the tube is greater than with the straight insert, which results in a greater extent of tube deformation during pressurization.

Example 2: Optimal Insert Fit

Figure 9:
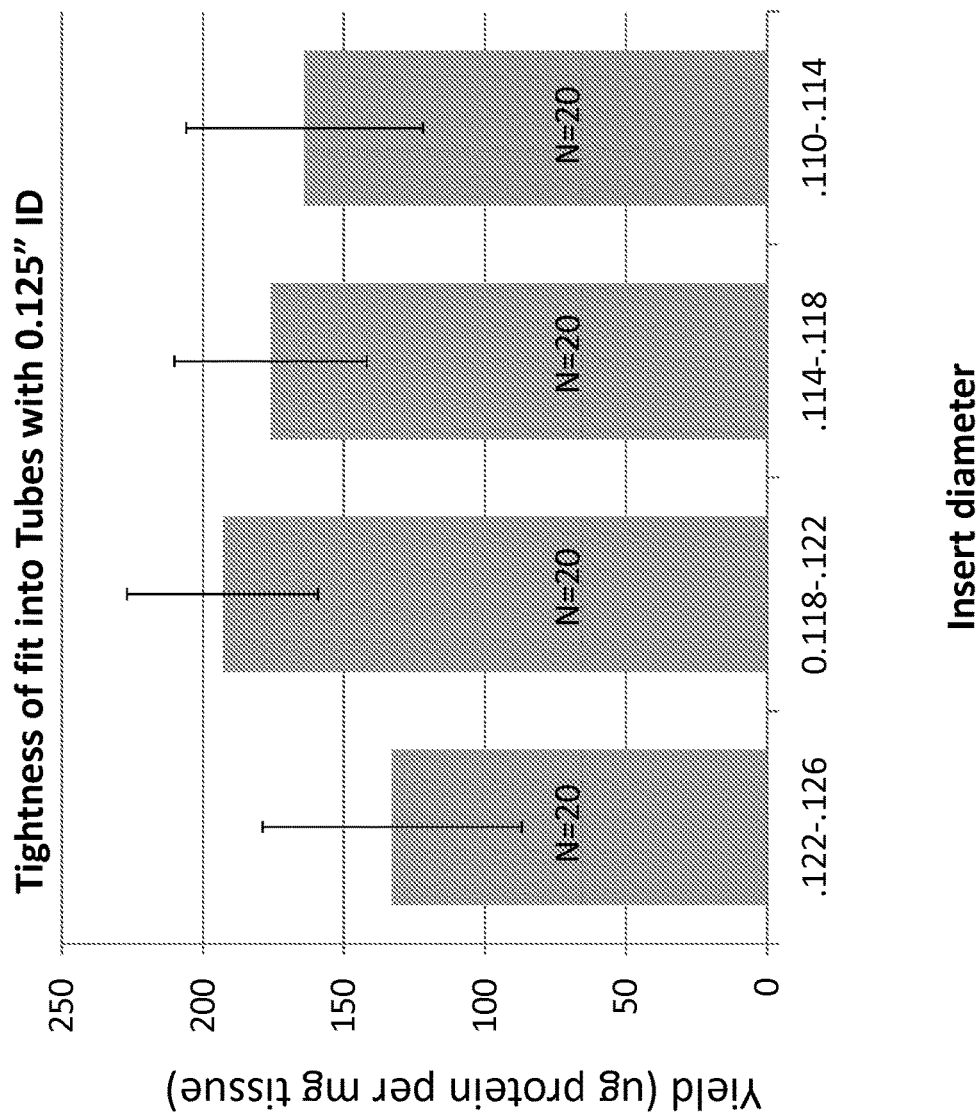
FIG. 9 is a chart showing the relationship between insert diameter size and protein yield according to an example.

Tapered inserts of various diameters were used to homogenize liver tissue samples. Liver tissue samples were placed in sample containers with an inner diameter of 0.125 in. for analytical preparation. About 0.5 to about 1.5 mg of liver tissue sample was placed in each of 80 sample containers. The sample containers were placed in a water-filled chamber that was pressurized at 35,000 psi for 60 cycles. Each cycle comprised 20 seconds at 35,000 psi, followed by 10 seconds at atmospheric pressure. The extent of tissue disruption was assessed visually and the yield of extracted protein was measured by Bradford assay and expressed in μg of protein per mg of tissue weight. FIG. 9 shows the effect of the tip diameter (and, therefore, the size of the annular gap) effect on tissue disruption and efficiency of protein extraction from the tissue specimens. Using tapered inserts of different diameter demonstrated that a too-tight fit resulted in less effective tissue disruption, probably as a result of compressing the tissue tightly at the tube bottom and not allowing enough clearance for the tissue to be squeezed up along the tube sides past the insert tip. As can be seen in FIG. 9, insert diameters of 0.118-0.122 in. produced a higher protein yield than did insert diameters of 0.114-0.118 in. Insert diameters of 0.114-0.118 in. produced higher protein yield than insert diameters of 0.110-0.114 in., which produced higher protein yield than insert diameters of 0.122-0.126 in.

Example 3: Optimum Number of Pressure Cycles

A sample of about 0.6-1.7 mg of rat liver with about 30 ul IEF extraction reagent (7M urea, 2M thiourea, and 4% CHAPS in deionized water) was added to each tube. Pressure cycling disruption was performed at 35,000 psi for the indicated number of cycles. The negative controls were undisrupted tissue pieces that were allowed to soak in the extraction reagent.

Figure 10:
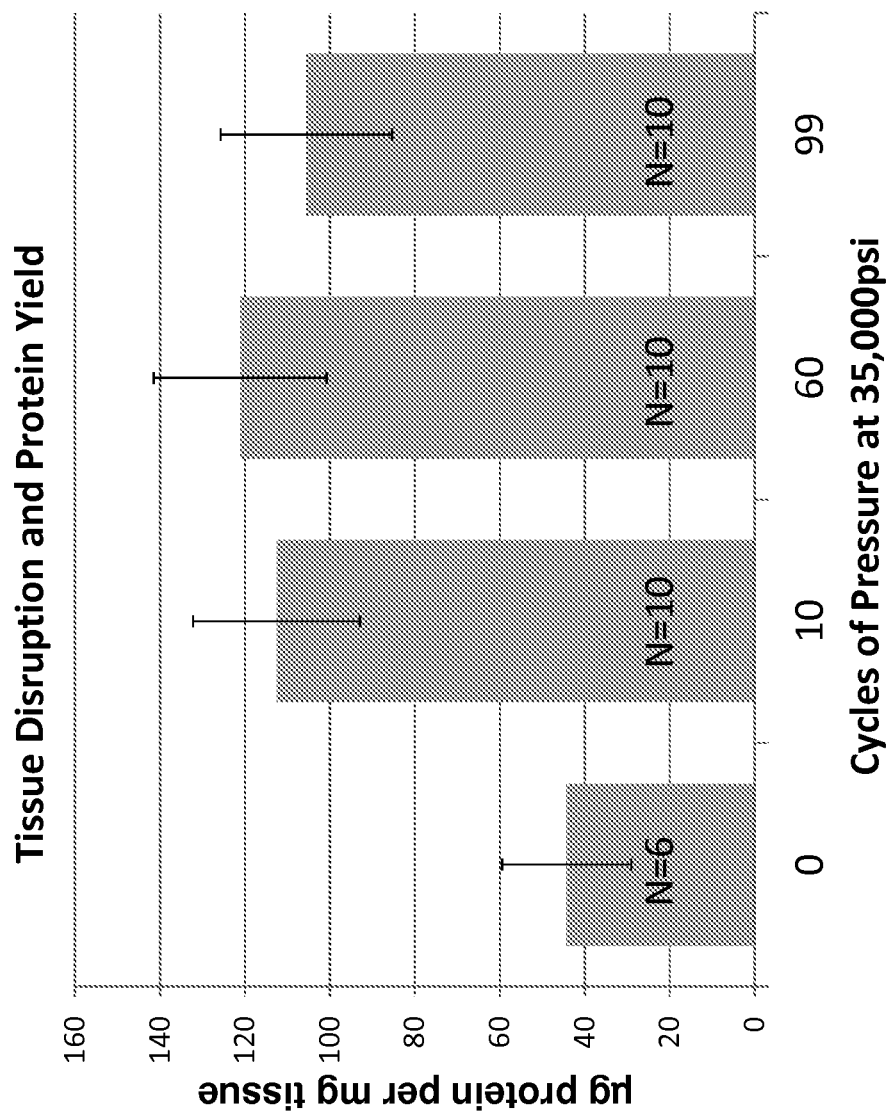
FIG. 10 is a chart showing the relationship between number of pressure cycles and protein yield according to an example.

FIG. 10 shows the effect of the number of pressure cycles on efficiency of protein extraction. Tapered inserts were used to examine the mechanism of action by which tissue homogenization occurs during sample disruption by high pressure tube compression.

Samples were homogenized for different lengths of time using 0, 10, 60 or 99 cycles of a high pressure of 35,000 psi and a low pressure of atmospheric pressure. That the total time the samples remained in the tubes was kept constant, and only the number of pressure cycles was varied. As can be seen in FIG. 10, a total of 60 pressure cycles produced a higher protein yield than did a total of 10 pressure cycles. The effect of over-homogenization is evident by the reduction in protein yield in samples disrupted using 99 pressure cycles. This effect of over-homogenization may be due to protein aggregation or precipitation while in a partially unfolded state at high hydrostatic pressure. Each number of pressure cycles—10, 60, and 99—produced a greater protein yield than no pressure cycles.

Example 4: Optimum Pressure and Number of Pressure Cycles

Samples of less than 2 mg of rat liver with 30 μL IEF extraction reagent were added to each tube. Pressure cycling disruption was performed at 35,000 psi for the indicated number of cycles as the indicated pressure, using tapered inserts. The negative controls were treated the same way as test samples, but were not subjected to pressure cycling.

Figure 11:
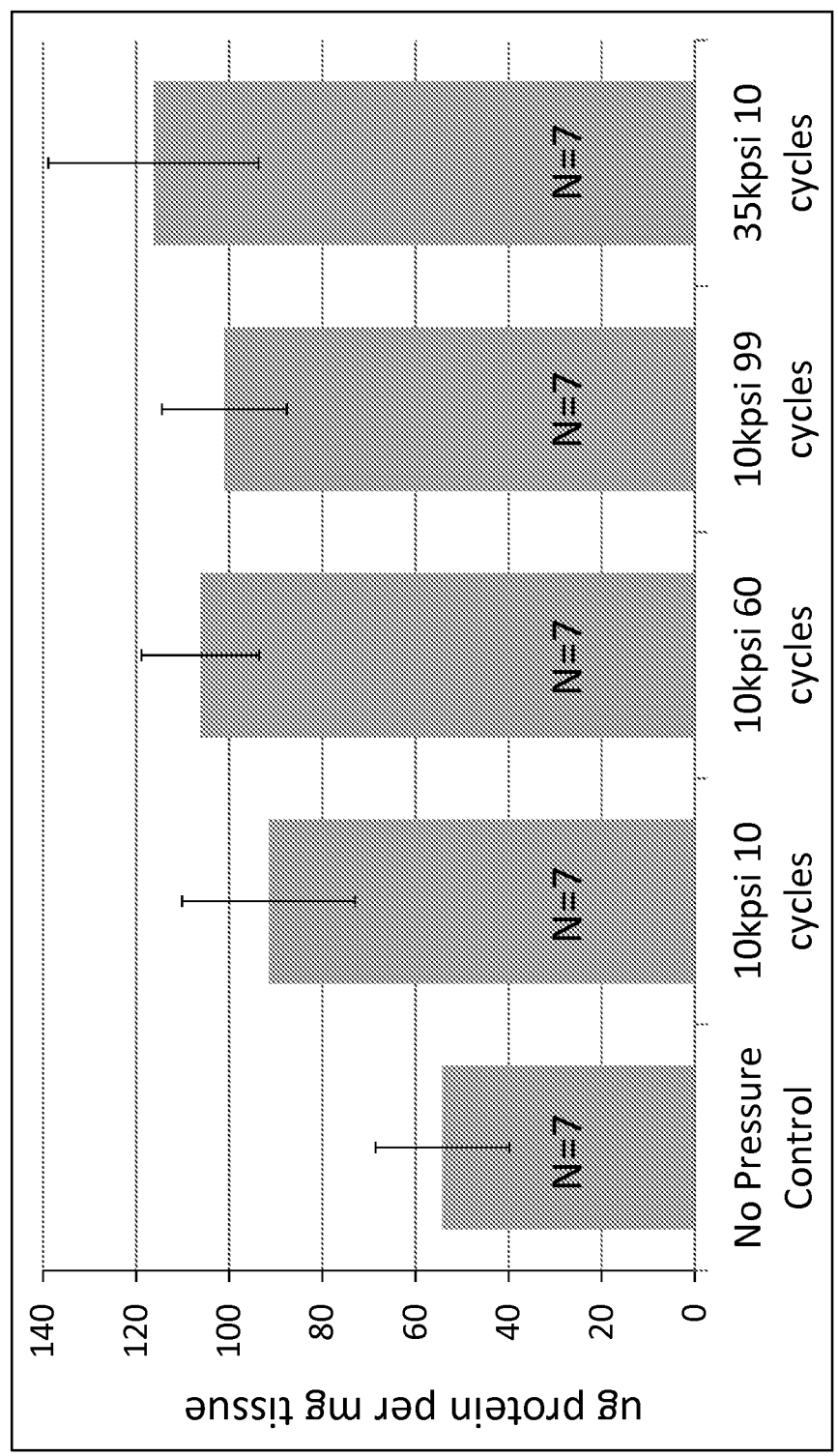
FIG. 11 is a chart showing the relationship between pressure, number of pressure cycles, and protein yield in accordance with at least one embodiment, according to an example.

FIG. 11 shows the effect of pressure and number of expansion/contraction cycles on efficiency of protein extraction from tissue samples.

Samples were homogenized using different levels of pressure and number of cycles. The total time the samples remained in the tubes was kept constant, and only the pressure cycling was varied. The effect of over-homogenization is evident by the slight reduction in protein yield in samples disrupted using 99 pressure cycles. This effect of over-homogenization may be due to pressure-induced protein aggregation or precipitation of proteins. The slightly improved protein yield in samples treated at 35,000 psi compared to 10,000 psi suggests that more severe tube compression at the higher pressure may lead to slightly better tissue homogenization.

Example 5: Reduced Sample Size Improves Effectiveness

Figure 12A:
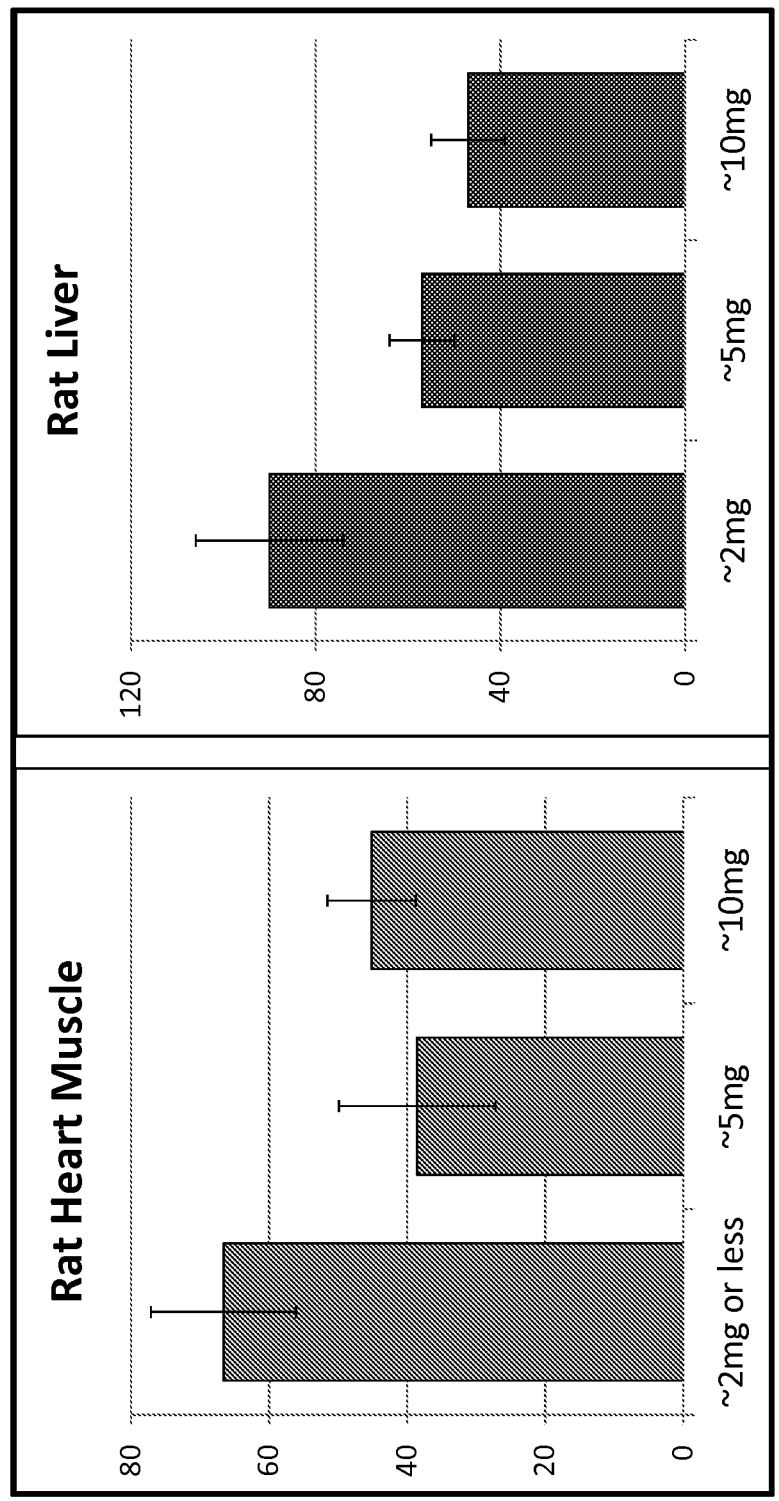
FIGS. 12a and 12b are charts showing the relationship between sample size and protein yield, according to an example.
Figure 12B:
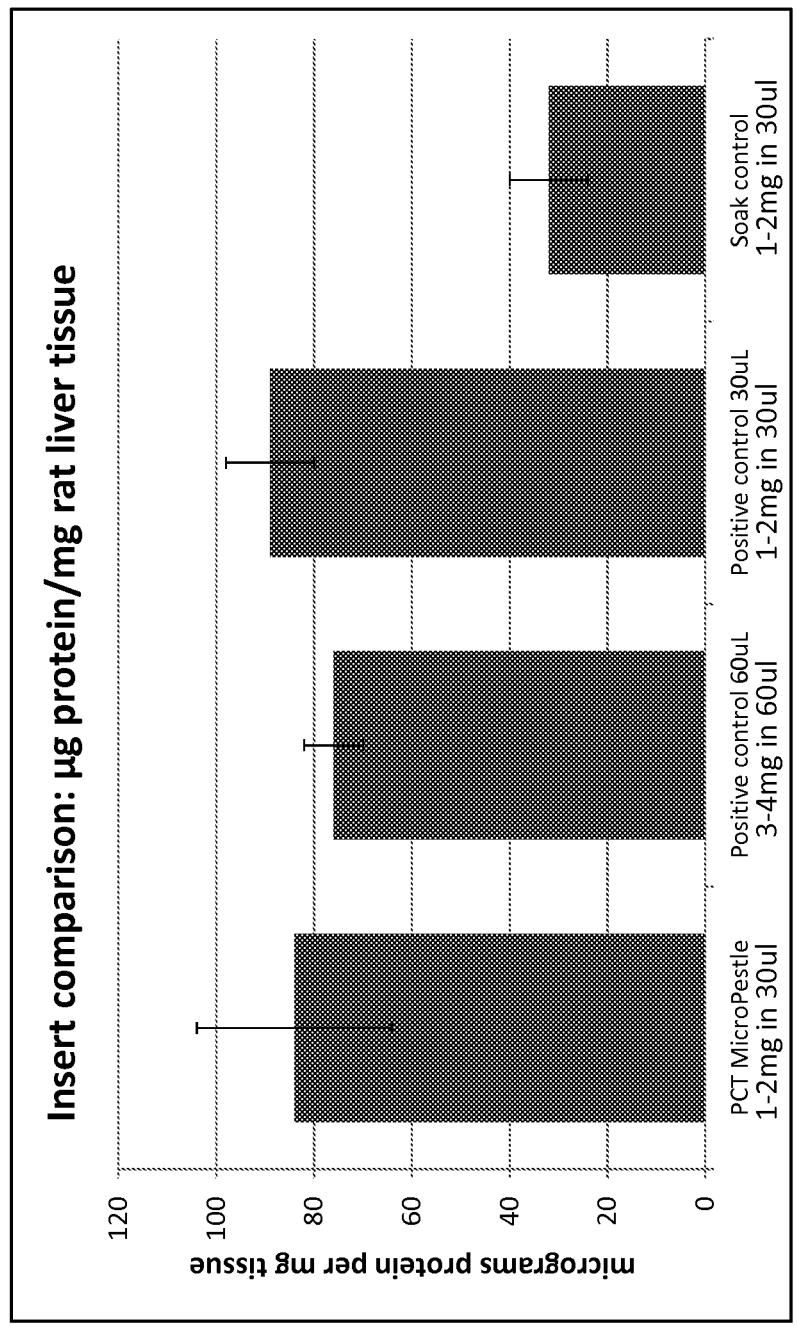

Samples of thawed rat liver and heart muscle tissue were rinsed in PBS and blotted to dry before weighing (n=6 per group). About 30 μL of lysis buffer was added to each sample. As can be seen in FIG. 12a, reducing the sample mass to ≤2 mg per sample results in better yield (as measured in ug protein per mg tissue mass) compared to larger samples (5-10 mg per sample) using the tapered insert. As can be seen in FIG. 12b, when comparable mass and volume conditions are used, the protein yield obtained from liver tissue using the tapered insert (labeled "MicroPestle" in the figure) with pressure is comparable to the yield using the positive control. Positive controls were homogenized manually using a disposable plastic pestle. Negative "soak" controls were not disrupted in any way, and the tissue was incubated in lysis buffer for the same total time as the other samples. Inserts were used with pressure cycling.

Example 6: Insert More Effective Than Sonication

Liver tissue was extracted in IEF using either the regular protocol (60 cycles at 40,000 psi), or sonication alone (2×30 s in sonicating bath), or a combination (30 cycle 40,000 psi to 30 s sonication to 30 cycles 40,000 psi to 30 s sonication). All samples comprised <2 mg tissue in 30 μL lysis buffer. There were 6 samples per group.

Figure 13:
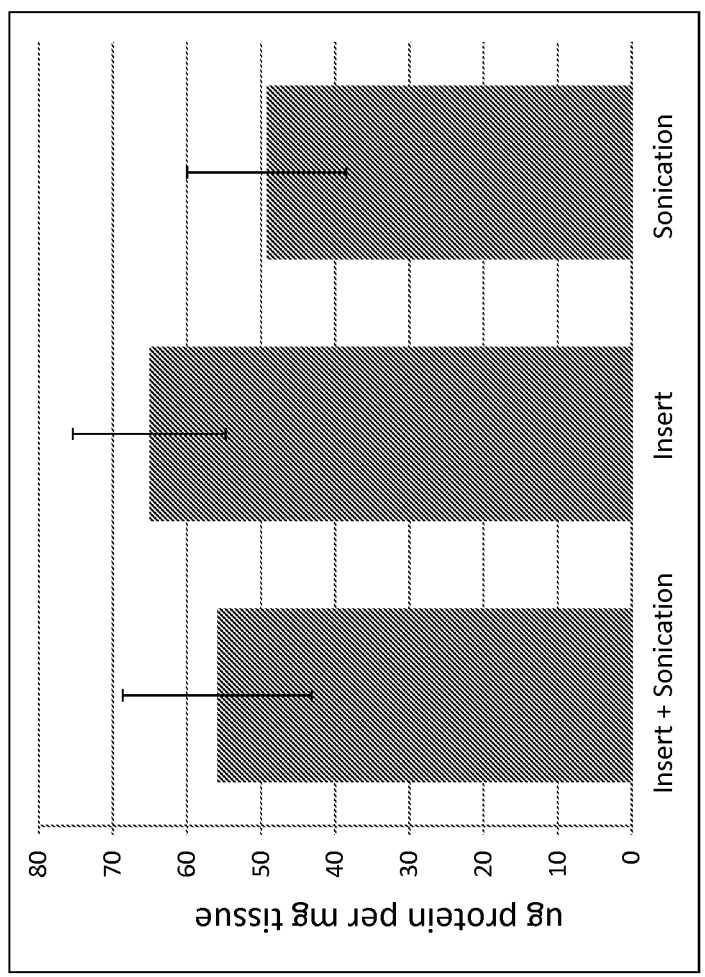
FIG. 13 is a chart showing a comparison of the effectiveness of the insert, the insert with sonication, and sonication alone, according to an example.

As can be seen in FIG. 13, the regular MicroPestle protocol produced greater yield than the combination of the two methods, which produced greater yield than sonication alone.

Example 7: Effect of Insert Re-Use on Protein Yield

Two batches of inserts were used on Jan. 6, 2014 with rat liver tissue. One older batch that had been used many times comprised pestles having a tip diameter of about 0.120 in. to about 0.123 in. A new batch which had a slightly wider pestle diameter of about 0.127 in. resulted in lower overall yield. They were then washed and re-run 14 times for 60 cycles per run, for a total of 840 cycles. The inserts were removed from the tubes and re-inserted for each run. These same 20 "new" inserts were then used with liver tissue again on Jan. 10, 2014.

Figure 14:
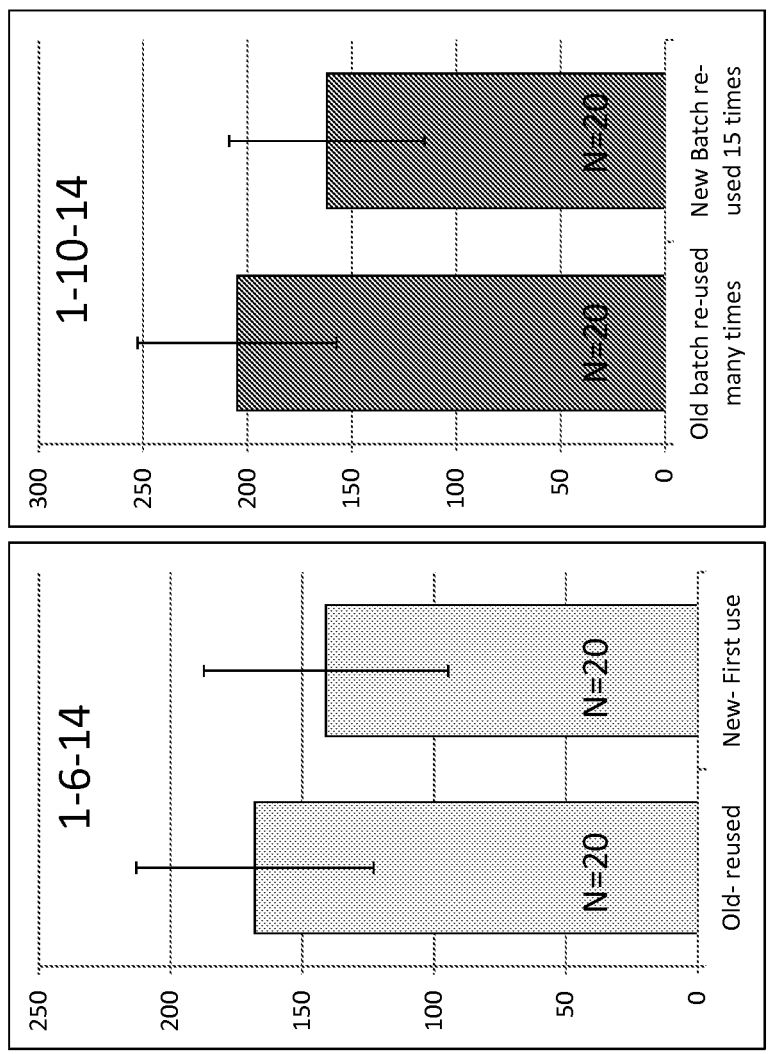
FIG. 14 is a chart comparing insert effectiveness according to an example.

As can be seen in FIG. 14, re-using the inserts does not appear to improve or harm their effectiveness. In addition, these results show that the old batch is genuinely better and the difference is not due to re-use of the older ones. These results confirm the importance of dimensional tolerance between the sample container and the insert for optimal performance. If the clearance is too large or too small, homogenization will be poor.

Example 8: Pressure Cycling with Insert vs. Pressure Cycling Without

Figure 15:
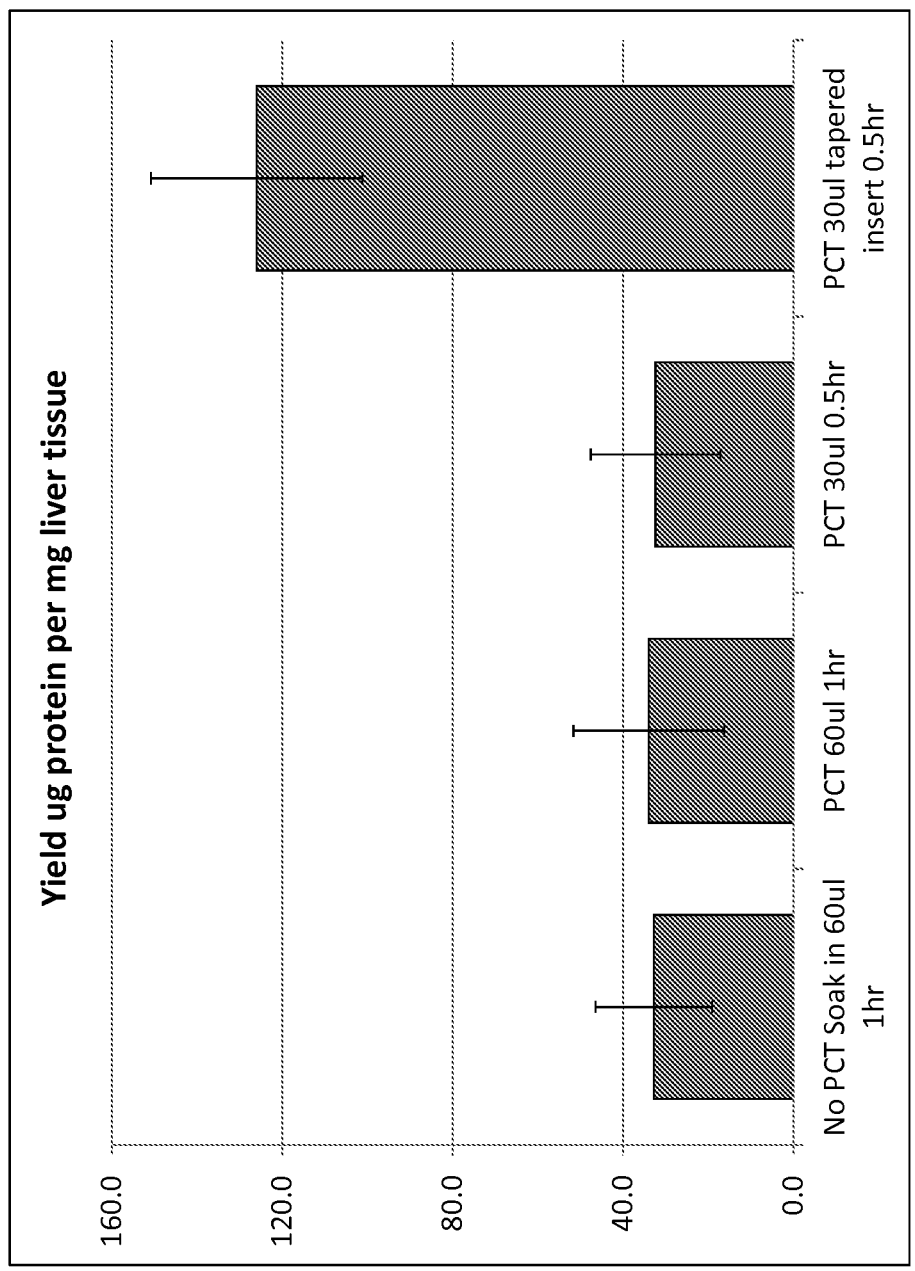
FIG. 15 is a chart showing the relationship between protein yield from pressure cycling with an insert and pressure cycling without an insert, according to an example.

Samples of between about 0.5 and about 1.5 mg of rat liver tissue were rinsed in PBS and blotted dry before weighing (n=12 per group). All samples (except negative controls) were treated with 60 cycles of pressure at 45,000 psi. The length of the cycles was adjusted to modify the total incubation time in the lysis buffer. Cycles of a half-minute each were used for the 0.5 hour samples. Cycles of 1 minute each were used for the 1 hour samples. As can be seen in FIG. 15, without the insert, the yield is the same whether or not the tissue sample is subjected to pressure, suggesting that pressure cycling alone does not effectively disrupt the tissue architecture to release cellular proteins regardless of other factors such as volume (30 µL vs. 60 µL), or incubation time (0.5 vs. 1 hr). The yield is significantly increased only in the samples that were pressurized with the tapered insert.

Figure 16:
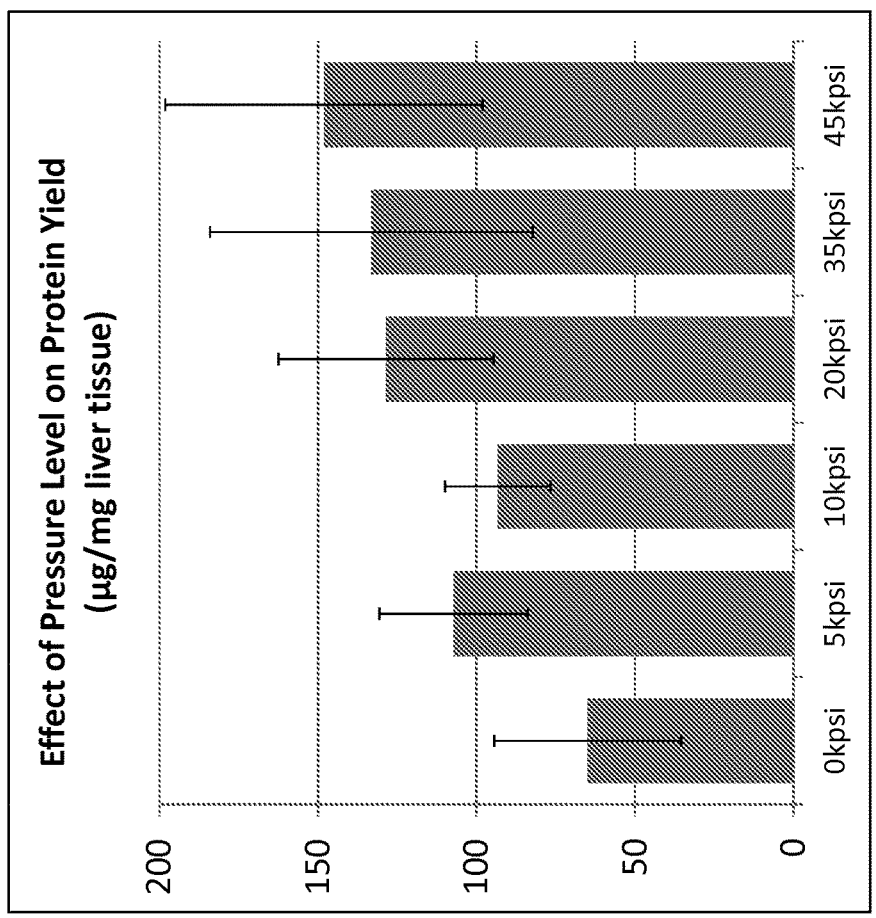
FIG. 16 is a chart and graph showing the relationship of pressure level and protein yield, according to an example.

Example 9: Effect of Pressure Level on Effectiveness of Extraction with Tapered Insert Samples of between 0.5 and 1.5 mg of tissue were rinsed in PBS and blotted to dry before weighing (n=10 per group unless indicated otherwise). 30 µl of lysis buffer was added to each sample. Inserts were used with and without pressure cycling. Pressure cycling was carried out for 30 cycles at the indicated pressure. Bars show average±standard deviation for extraction of protein from liver tissue. The table shows yield and standard error of the mean (SEM) for protein extraction from heart muscle tissue. The 0 kpsi control indicates a set-up as with an insert, but without pressure cycling. This is not the same as the "soak only" control. As can be seen in FIG. 16, a pressure of 45 kpsi yielded the highest amount of protein.

Figure 17:
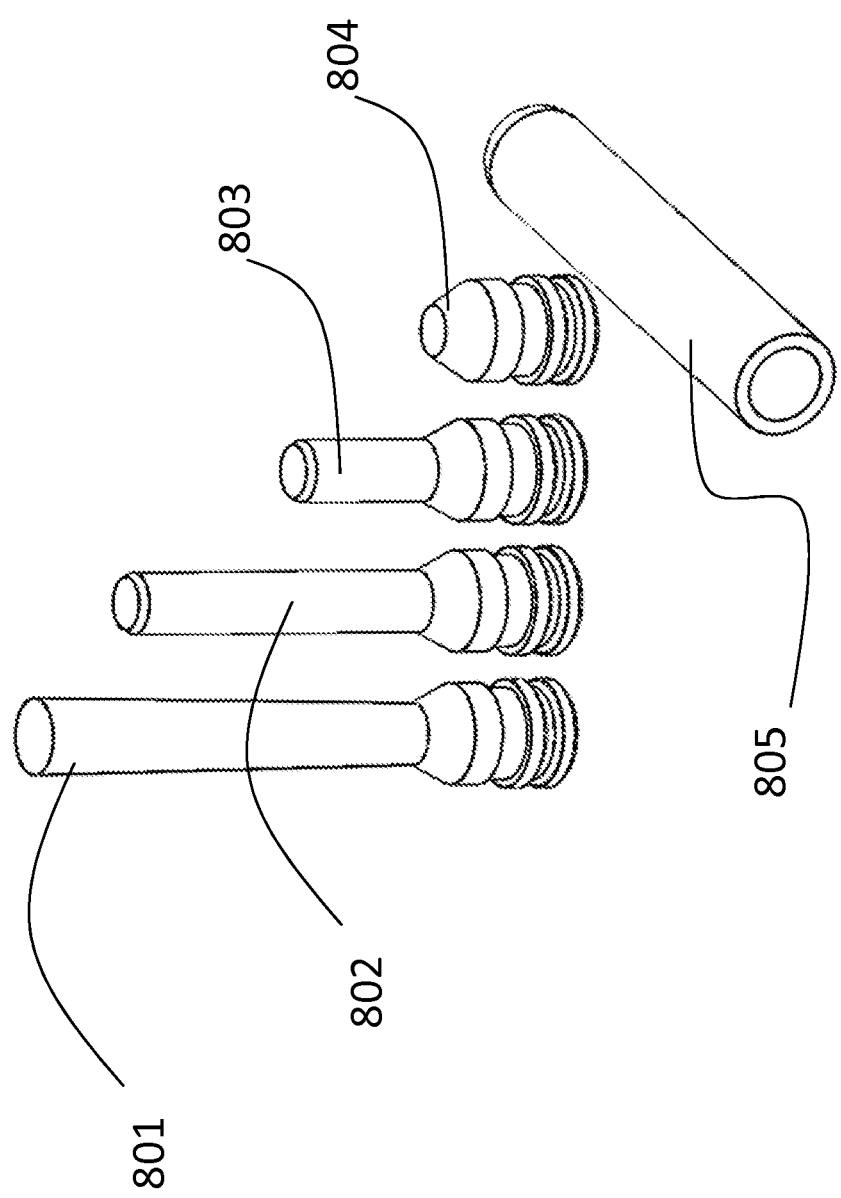
FIG. 17 is a perspective view of deformable cap and elongate member assemblies, according to one or more embodiments.

Example 10. Extraction with Pressure and Insert can be Combined with Other Methodologies for Sample Preparation Prior to Analysis As shown in FIG. 17 the tapered insert 801, is one of several interchangeable closures 802, 803, 804 that can be used with a sample tube 805 under pressure. Therefore, protocols such as the following can be performed without transferring the samples from one container to another, which reduces the risk of sample loss, cross-contamination, and exposure of the user:
1. Place tissue into sample tube with 30 µl of lysis buffer containing 4M urea and seal with tapered insert.
2. Place the sealed tubes with inserts into cartridge 901 designed to hold the tubes 902 during pressure treatment (FIG. 18) in a barocycler. The cartridges are designed to keep the tubes secure and to prevent loosening of the caps (which could lead to sample leaking out or pressure media leaking in)
3. Treat the samples with pressure cycling.
4. Remove tubes from barocycler and from cassette. Remove the tapered insert.
5. To the homogenized sample in the tube add 10 µl of appropriate buffer to dilute the urea in the lysis buffer to 3M from 4M. Add appropriate enzyme such as proteinase Lys-C.
6. Seal the tube with a cap that is long enough to displace excess air and prevent tube denting under pressure, but short enough to accommodate the sample volume, and place the sealed tubes into cartridge designed to hold the tubes during pressure treatment.
7. Treat the samples with pressure cycling under conditions appropriate for accelerated digestion with Lys-C.
8. Remove tubes from barocycler and from cassette. Remove the long cap.
9. To the partially digested sample in the tube add 100 µl of appropriate buffer to dilute the urea in the buffer to 0.8M from 3M. Add appropriate enzyme such as trypsin.
10. Seal the filled tube with a short cap that accommodates the entire sample volume. Place the sealed tubes into cartridge designed to hold the tubes during pressure treatment
11. Treat the samples with pressure cycling under conditions appropriate for accelerated digestion with trypsin.

Having now described some illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of and" "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A sample preparation device, comprising:
    a deformable tube having a top and a bottom, the tube configured to contain a sample at the bottom and further configured to be received into a pressure chamber for sample preparation;
    a cap detachably connected to the top of the tube to provide an isolated sample environment; and
    a tapered elongate member extending from the cap into the tube, the tapered elongate member being separated from the bottom of the tube by a space in which the sample is contained, the tapered elongate member being configured to disrupt the sample in the bottom of the tube during operation,
    wherein, in operation under pressure, the tube is deformed around the tapered elongate member thereby reducing the space in which the sample is contained to promote disruption of the sample while maintaining the isolated sample environment.

2. The device of claim 1, wherein the sample is a fine needle biopsy sample.

3. The device of claim 1, wherein a size of the sample is less than about 30 mg.

4. The device of claim 1, wherein at least one of the tube and the tapered elongate member is made of polytetrafluoroethylene (PTFE) or fluorinated ethylene propylene (FEP).

5. The device of claim 1, wherein at least one of the tube and the tapered elongate member is a consumable intended for single use.

6. The device of claim 1, wherein the tapered elongate member is integral to the cap.

7. The device of claim 1, wherein the cap is configured so that a pressure differential inside and outside the tube causes flexible deformation of the cap that results in a reciprocal movement of the tapered elongate member to disrupt the sample while maintaining the isolated sample environment.

* * * * *